United States Patent [19]
Yamada et al.

[11] Patent Number: 5,692,222
[45] Date of Patent: Nov. 25, 1997

[54] CAMERA HAVING FOCUS DETECTION DEVICE

[75] Inventors: Akira Yamada; Yoshiaki Irie, both of Yokohama; Akihiko Nagano, Ichihara, all of Japan

[73] Assignee: Canon Kabushiki Kaisha, Tokyo, Japan

[21] Appl. No.: 552,116

[22] Filed: Nov. 2, 1995

[30] Foreign Application Priority Data

Nov. 8, 1994 [JP] Japan .................. 6-298053

[51] Int. Cl.$^6$ ............................................ G03B 13/36
[52] U.S. Cl. ...................... 396/51; 396/92; 396/121; 396/147
[58] Field of Search ...................... 354/402, 406, 354/407, 408, 409, 410, 400; 396/121, 122, 123, 147, 92, 51

[56] References Cited

U.S. PATENT DOCUMENTS 5,296,888  3/1994  Yamada .................. 354/402
5,422,700  6/1995  Suda et al. .............. 354/402
5,473,403  12/1995 Suda et al. .............. 354/409
5,485,239  1/1996  Ohsawa .................. 354/402
5,530,513  6/1996  Ohsawa .................. 354/402

FOREIGN PATENT DOCUMENTS 1288813  11/1989  Japan .................. G02B 7/11
3109029  5/1991   Japan .................. A61B 3/113

*Primary Examiner*—W. B. Perkey
*Attorney, Agent, or Firm*—Fitzpatrick, Cella, Harper & Scinto

[57] ABSTRACT

A focus adjusting apparatus which includes a focus detection device for independently detecting focus states of N different regions in a scene. The apparatus includes a selection circuit and a focus adjustment circuit. The selection circuit simultaneously selects, among the N regions, an arbitrary number of regions, the arbitrary number being less than N, and the selection circuit setting, among the N regions which are all selectable, a first number and a second number, different from the first number, of regions as regions simultaneously selected. The focus adjustment circuit performs focus adjustment on the basis of the focus states independently detected in the regions set by the selection circuit.

30 Claims, 31 Drawing Sheets

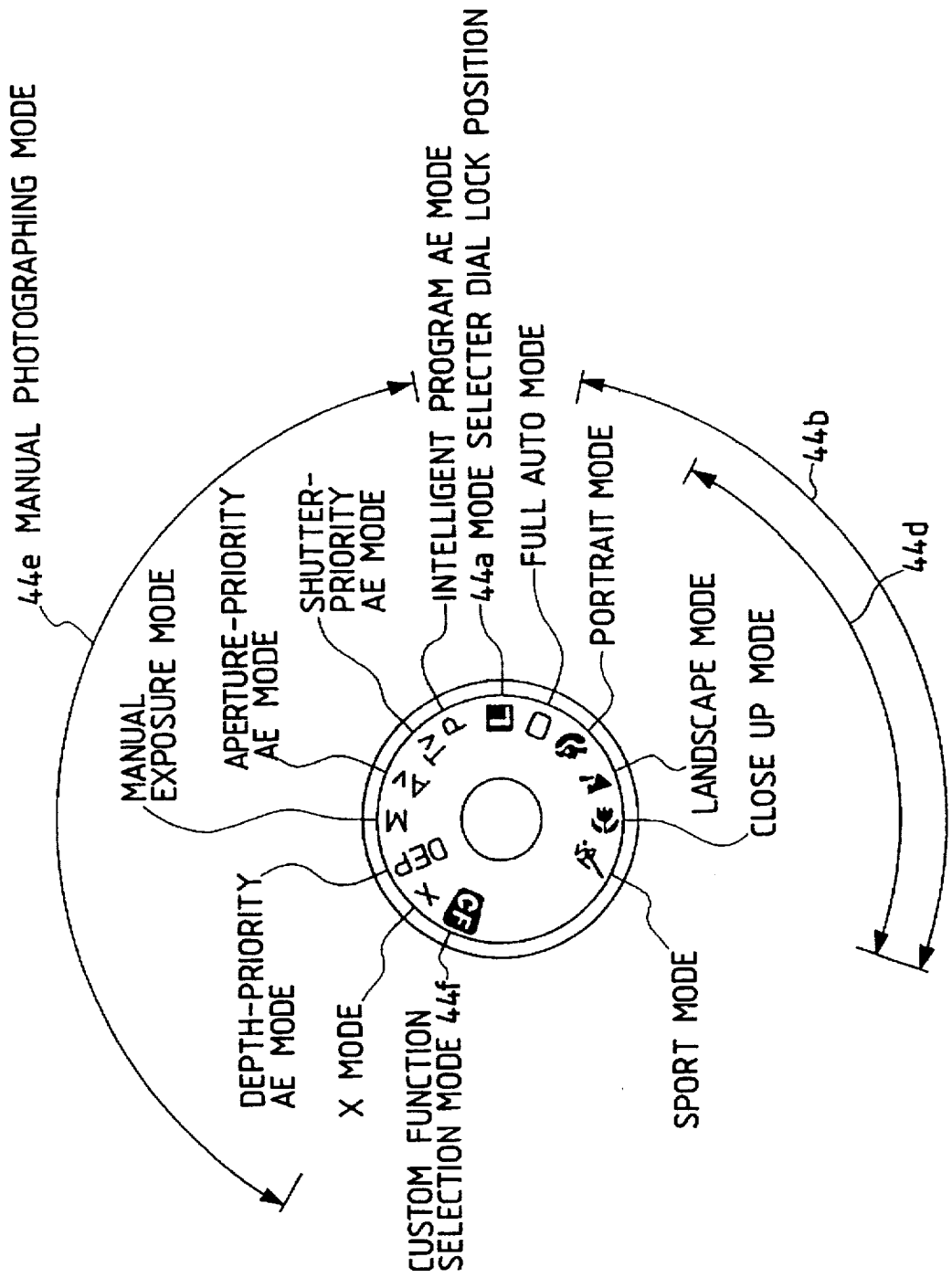

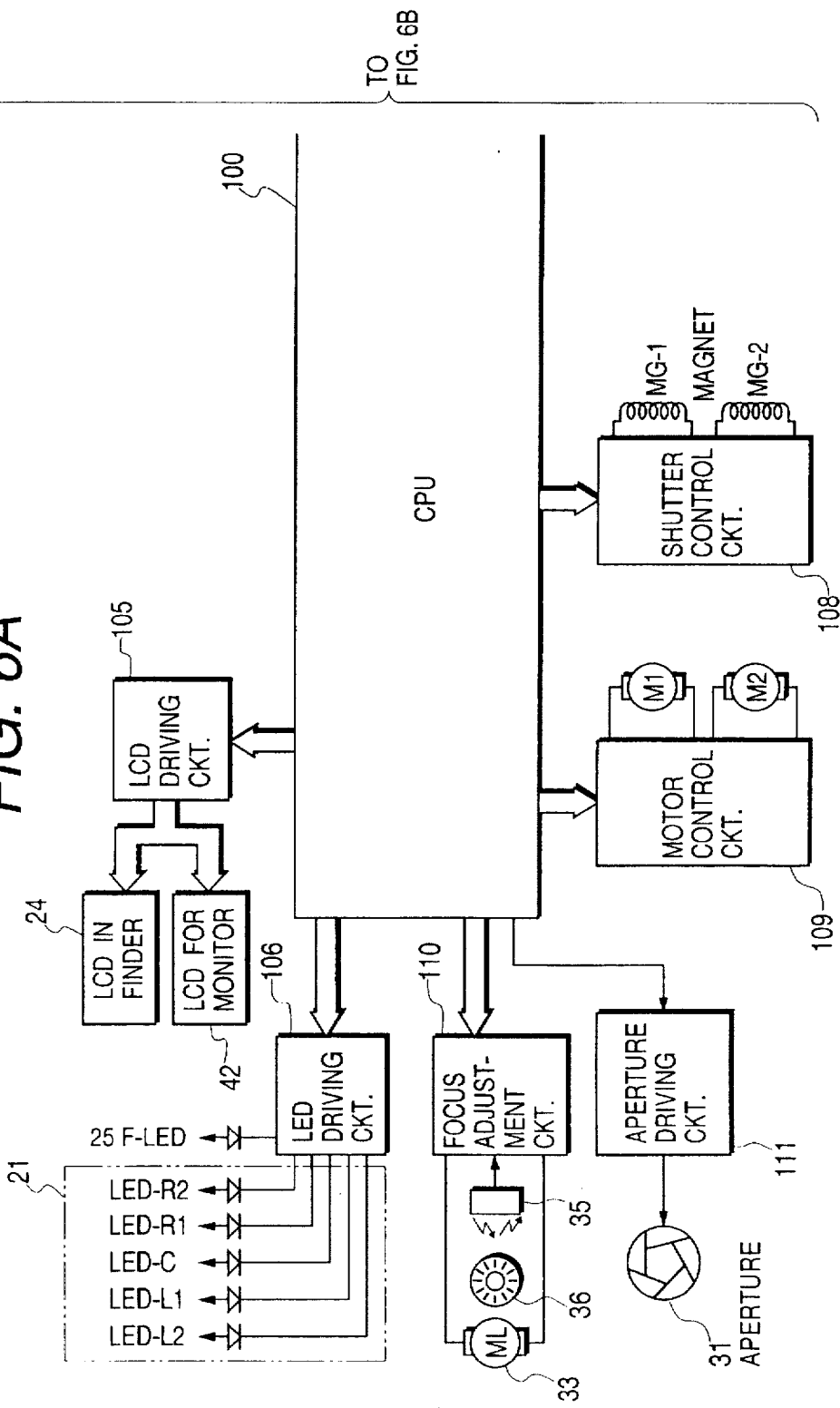

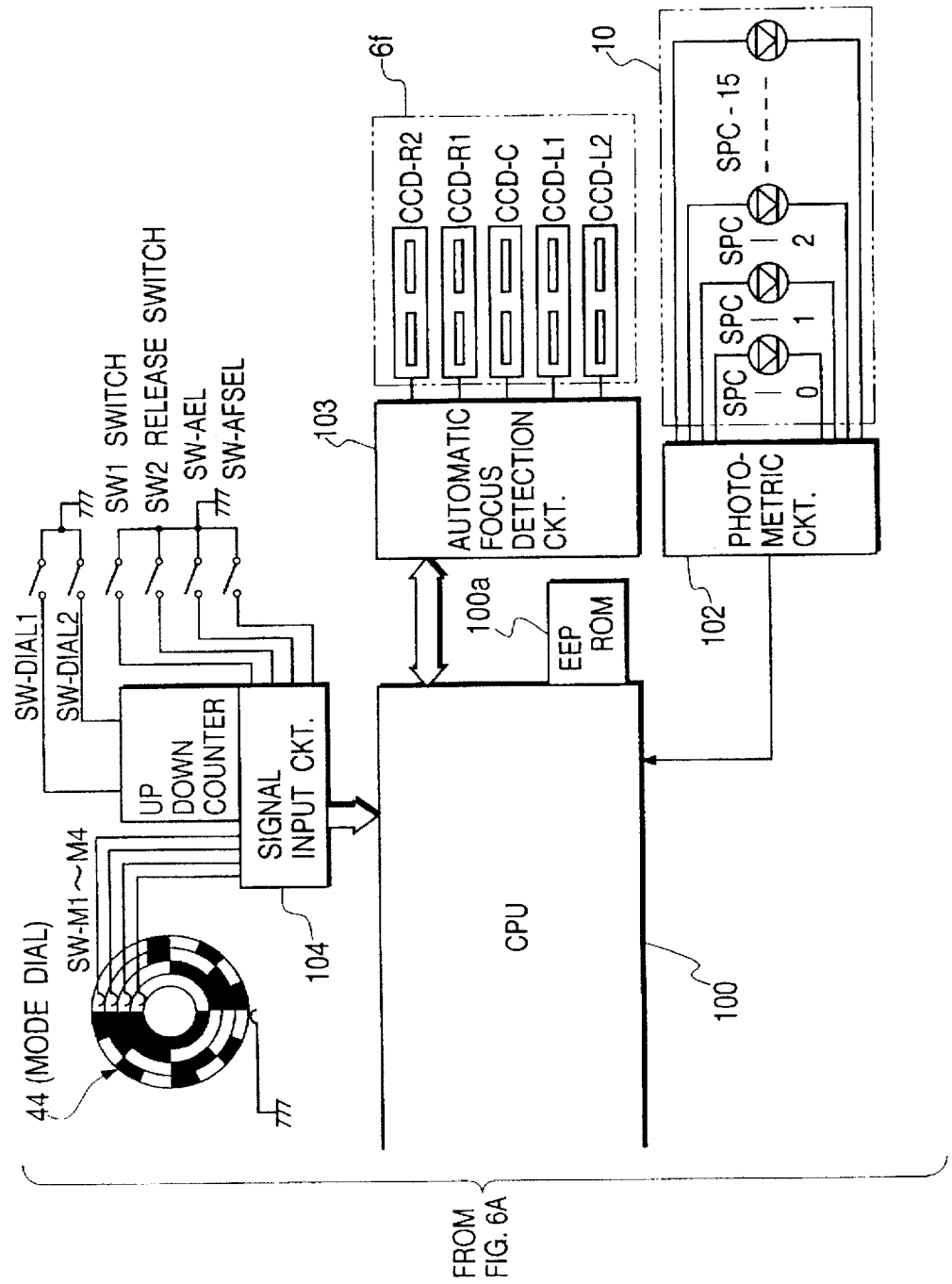

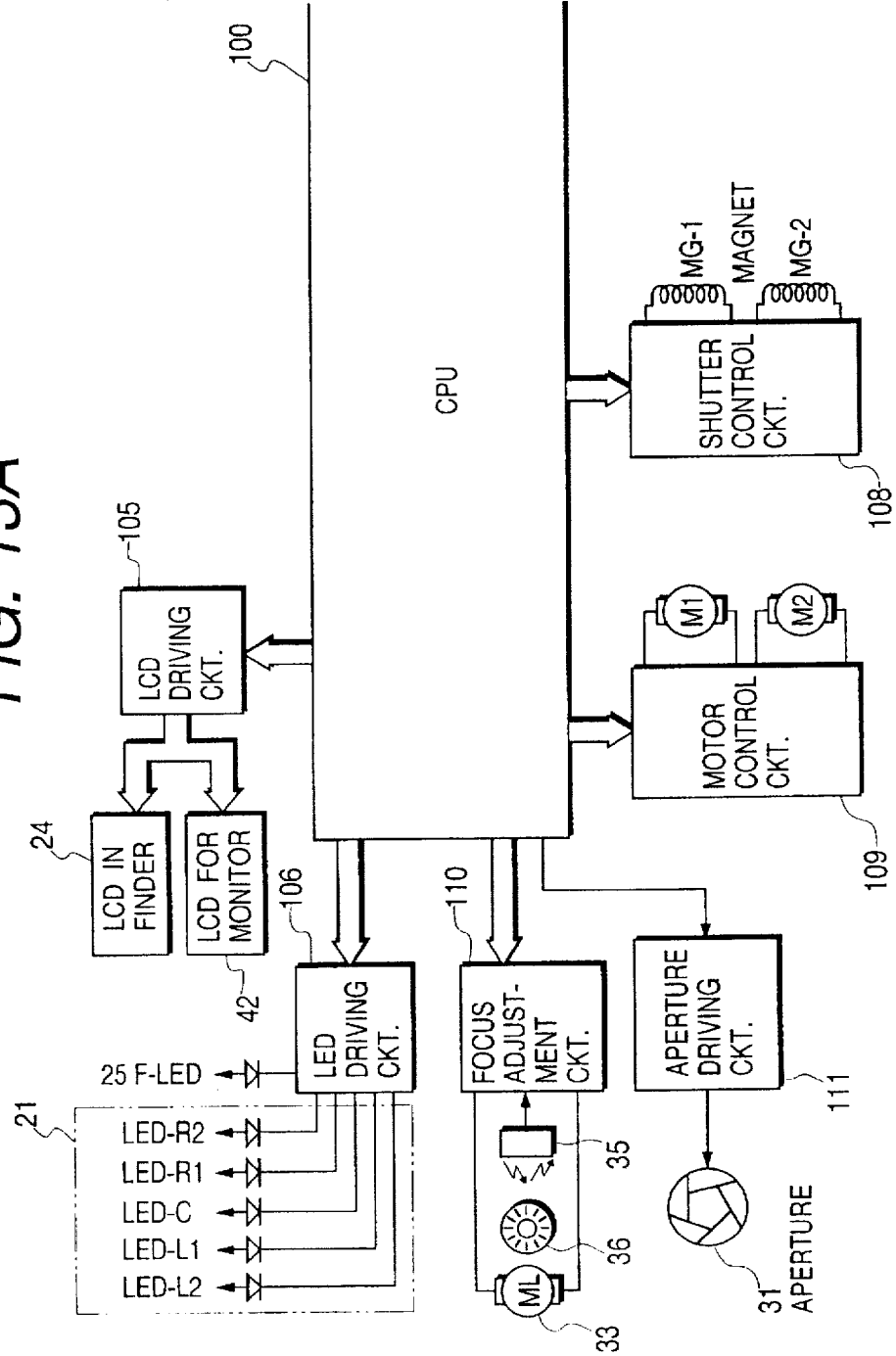

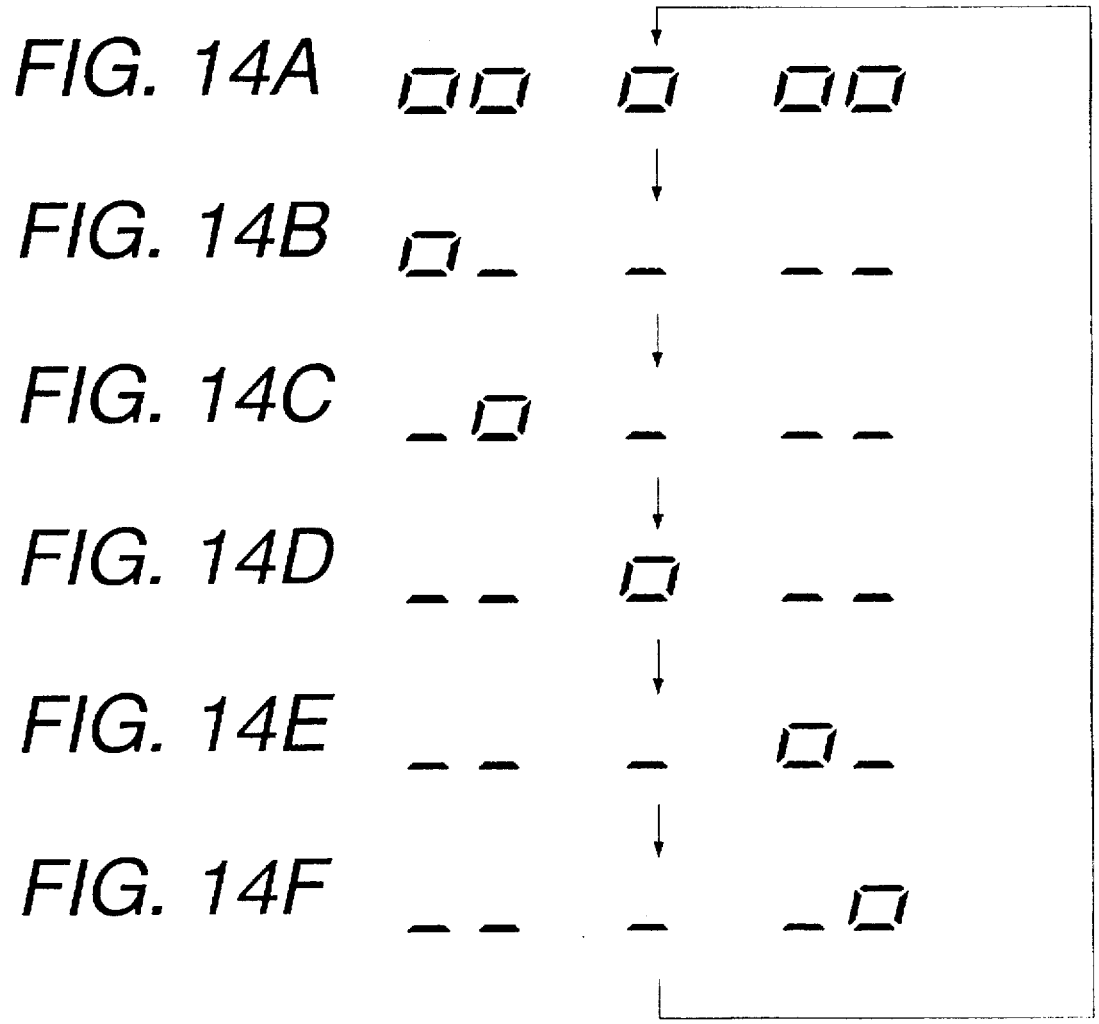

FIG. 20

| PHOTOGRAPHING MODE | FOCUS DETECTION POINT ZONE TO BE SELECTED | CORRESPONDING FIGURE |
|---|---|---|
| PROGRAM AE | ALL FOCUS DETECTION POINT ZONE + PARTIAL FOCUS DETECTION POINT ZONE (C) | FIGS. 19A TO 19D |
| SHUTTER-PRIORITY AE | ALL FOCUS DETECTION POINT ZONE + PARTIAL FOCUS DETECTION POINT ZONE (B) | FIGS. 18A TO 18E |
| APERTURE-PRIORITY AE | ALL FOCUS DETECTION POINT ZONE + PARTIAL FOCUS DETECTION POINT ZONE (A) | FIGS. 15A TO 15D |
| DEPTH OF FIELD-PRIORITY AE | ALL FOCUS DETECTION POINT ZONE + SINGLE FOCUS DETECTION POINT ZONE | FIGS. 14A TO 14F |
| MANUAL EXPOSURE | SINGLE FOCUS DETECTION POINT ZONE | FIGS. 9B TO 9F |
| FULL AUTO MODE | ALL FOCUS DETECTION POINT ZONE | FIGS. 9A etc. |
| IMAGE ZONE MODE | ALL FOCUS DETECTION POINT ZONE | FIGS. 9A etc. |

FIG. 21

| FOCAL LENGTH OF LENS (mm) | FOCUS DETECTION POINT ZONE TO BE SELECTED | CORRESPONDING FIGURE |
|---|---|---|
| LESS THAN 35 | ALL FOCUS DETECTION POINT ZONE | FIGS. 19A |
| MORE THAN OR EQUAL TO 35 ~ LESS THAN 70 | ALL FOCUS DETECTION POINT ZONE + SINGLE FOCUS DETECTION POINT ZONE | FIGS. 14A TO 14F |
| MORE THAN OR EQUAL TO 70 ~ LESS THAN 135 | ALL FOCUS DETECTION POINT ZONE + PARTIAL FOCUS DETECTION POINT ZONE (A) | FIGS. 15A TO 15D |
| MORE THAN OR EQUAL TO 135 ~ LESS THAN 300 | ALL FOCUS DETECTION POINT ZONE + PARTIAL FOCUS DETECTION POINT ZONE (B) | FIGS. 18A TO 18E |
| MORE THAN OR EQUAL TO 300 ~ | ALL FOCUS DETECTION POINT ZONE + PARTIAL FOCUS DETECTION POINT ZONE (C) | FIGS. 19A TO 19D |
| CLOSE UP LENS OR CLOSE UP MODE | SINGLE FOCUS DETECTION POINT ZONE | FIGS. 9B ~ 9F |

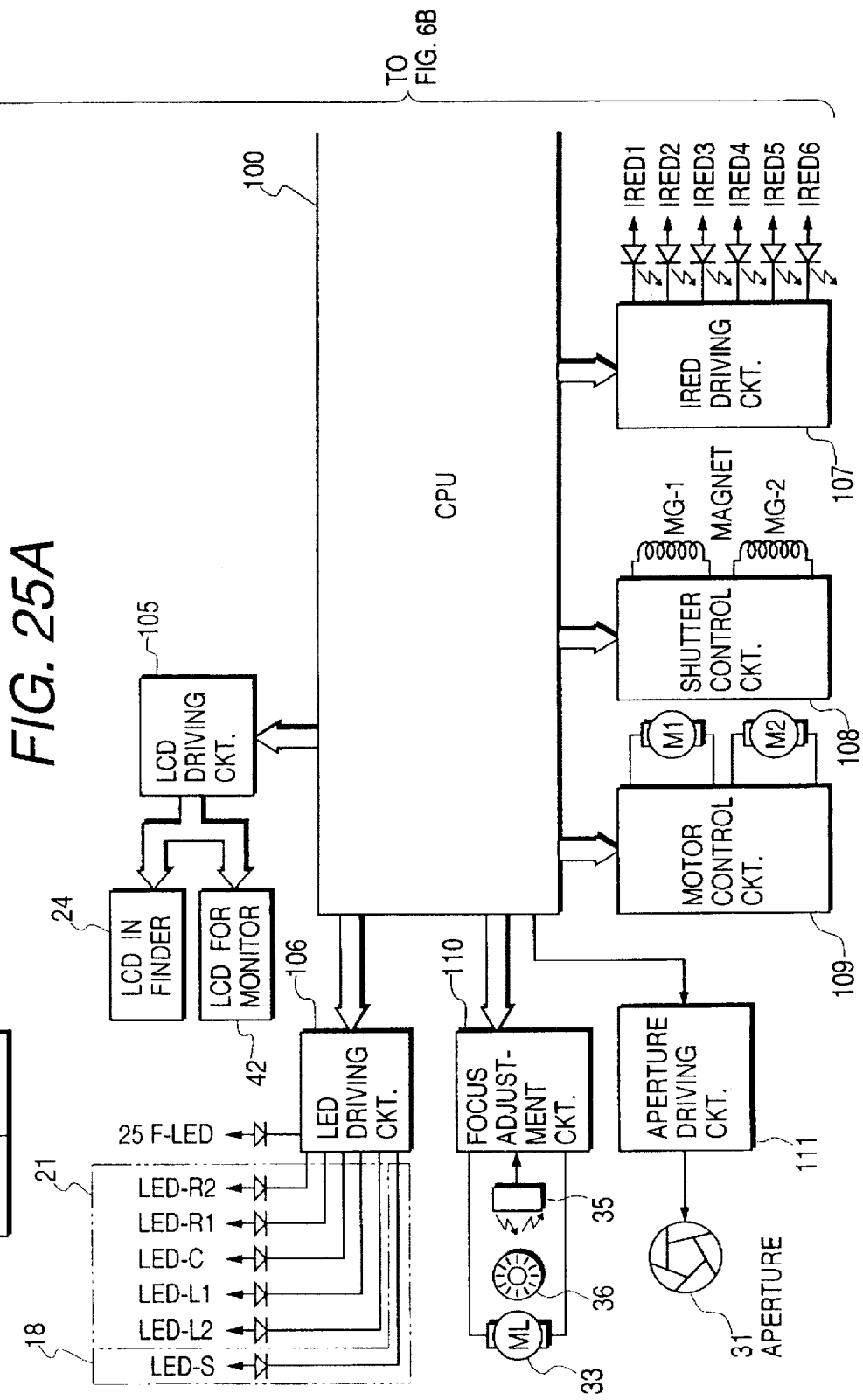

CAMERA HAVING FOCUS DETECTION DEVICE

BACKGROUND OF THE INVENTION

1. Field of the Invention

The present invention relates to an improvement in an automatic focusing camera comprising focus detection means with three or more focus detection points (distance measurement points) in a finder field.

2. Related Background Art

Conventionally, various automatic focusing cameras (to be abbreviated as AF cameras, hereinafter) having a plurality of focus detection points (focus detection regions) in the finder field have been proposed, and some such cameras are commercially available. An AF camera of this type performs automatic focus adjustment of the photographing lens on the basis of respective focus detection information output from focus detection means corresponding to the focus detection points. In this case, although one of the focus detection points is selected to be used in an actual focus adjustment operation of the photographing lens, the focus detection states of all the focus detection points are detected, and thereafter, one focus detection point is selected by a predetermined automatic selection algorithm. (A "near point priority algorithm" for preferentially selecting a focus detection point at which the closest object is detected is normally used.)

An automatic focus detection device which presents a method of appropriately extracting one focus detection point on the basis of the focus detection results of a plurality of focus detection points is disclosed in, e.g., Japanese Laid-Open Patent Application No. 1-288813 filed by the present applicant.

Also, a camera which selects an arbitrary (one) focus detection point using manual focus detection point switching means, and a camera which automatically sets one or a plurality of focus detection points are realized.

Furthermore, recently, an AF camera adopting a line-of-sight input technique for detecting the line-of-sight direction of a photographer in the finder and selecting one focus detection point closest to the detected line-of-sight direction is also realized.

When the automatic focus detection means which can detect focal point information of all the focus detection points is used, a principal object in a normal photographing operation is included in some of the focus detection points due to a broad focus detection range even when the principal object is not located at the center of the frame, and in most cases the principal object can be accurately set in an in-focus state without changing the photographing field of the camera. However, when an obstacle is present in front of the principal object or when an object which has a higher contrast than the principal object and is easily subjected to focus detection is present, a focus detection point which detects such an object is often erroneously selected. In particular, such an error is often experienced in a vertical-posture photographing mode. Furthermore, since the focus detection operation is performed for all the focus detection points, the focus detection time is prolonged in proportion to the number of focus detection points, and a long time is consequently required until the photographing lens reaches an in-focus state.

Thus, when a photographer switches the focus detection mode from a mode using all the focus detection points to a mode using an arbitrary one focus detection point, he or she can accurately attain a focusing operation of the principal object without changing the photographing field of the camera. However, it is very cumbersome to manually switch the focus detection point, and a good shutter chance may be lost.

In addition, since one focus detection point is selected, it is difficult to always follow an object by one point. In particular, an object having a small area in the frame may shift from the focus detection point soon upon its movement or upon changing of the photographing field, and an accurate focusing operation cannot be then attained.

In a hand-held photographing operation using a heavy lens such as an ultra-telephoto lens, the camera shake is considerable, and the relative moving speed of an object in the frame increases. For this reason, it is difficult to keep track of the principal object by one focus detection point.

Even in the above-mentioned AF camera adopting the line-of-sight input technique, the above-mentioned problems remain unsolved since only one point is selected, although a problem associated with a manual cumbersome operation can be solved.

SUMMARY OF THE INVENTION

One aspect of the application is to provide an automatic focusing camera which can select a plurality of arbitrary ones of all the focus detection points, and can quickly attain an accurate focusing operation on a principal object independently of the size of the principal object in the photographing frame or the relative positional relationship between the photographing frame and the principal object in a photographing operation.

One aspect of the application is to provide an automatic focusing camera which can automatically set a focus detection point zone corresponding to every photographing state, and can quickly attain an accurate focusing operation on a principal object.

One aspect of the application is to provide an automatic focusing camera which can easily arbitrarily set a focus detection point zone, and allows a photographing operation according to a photographer's free will.

One aspect of the application is to provide a camera which has a mode for arbitrarily selecting one or a plurality of ones of a plurality of focus detection points, and a mode for selecting a focus detection point in a pattern different from the former mode, and performs focus detection using the focus detection points according to a photographer's will by selecting one of these modes.

One aspect of the application is to provide a camera which operates to simultaneously select two or more arbitrary regions of focus detection points, and performs focus detection using the focus detection points according to a photographer's will.

One aspect of the application is to provide a camera which performs the above-mentioned selection of focus detection points in correspondence with the photographing mode of the camera or the characteristic of a photographing lens.

One aspect of the application is to provide a focus detection device which selects different numbers of focus detection points as zones.

Other objects of the present invention will become apparent from the following description of the embodiments taken in conjunction with the accompanying drawings.

BRIEF DESCRIPTION OF THE DRAWINGS

FIG. 5 is a plan view showing the details of a mode dial shown in FIGS. 4A and 4B;

FIG. 6, comprised of FIGS. 6A and 6B, is a block diagram showing the electrical arrangement of the camera shown in FIG. 1;

FIG. 8 is a view showing the state wherein all the LCDs for the monitor in FIG. 5 are turned on;

FIGS. 14A to 14F are views for explaining the selection of a focus detection point zone in the second embodiment of the present invention;

FIG. 20 is a table for explaining focus detection point zones selected in correspondence with different photographing modes in the fourth embodiment of the present invention;

FIG. 21 is a table for explaining focus detection point zones selected in correspondence with the focal length information of a photographing lens in the fourth embodiment of the present invention;

DESCRIPTION OF THE EMBODIMENT OF THE INVENTION

The present invention will be described in detail hereinafter on the basis of the illustrated embodiments.

Figure 1:
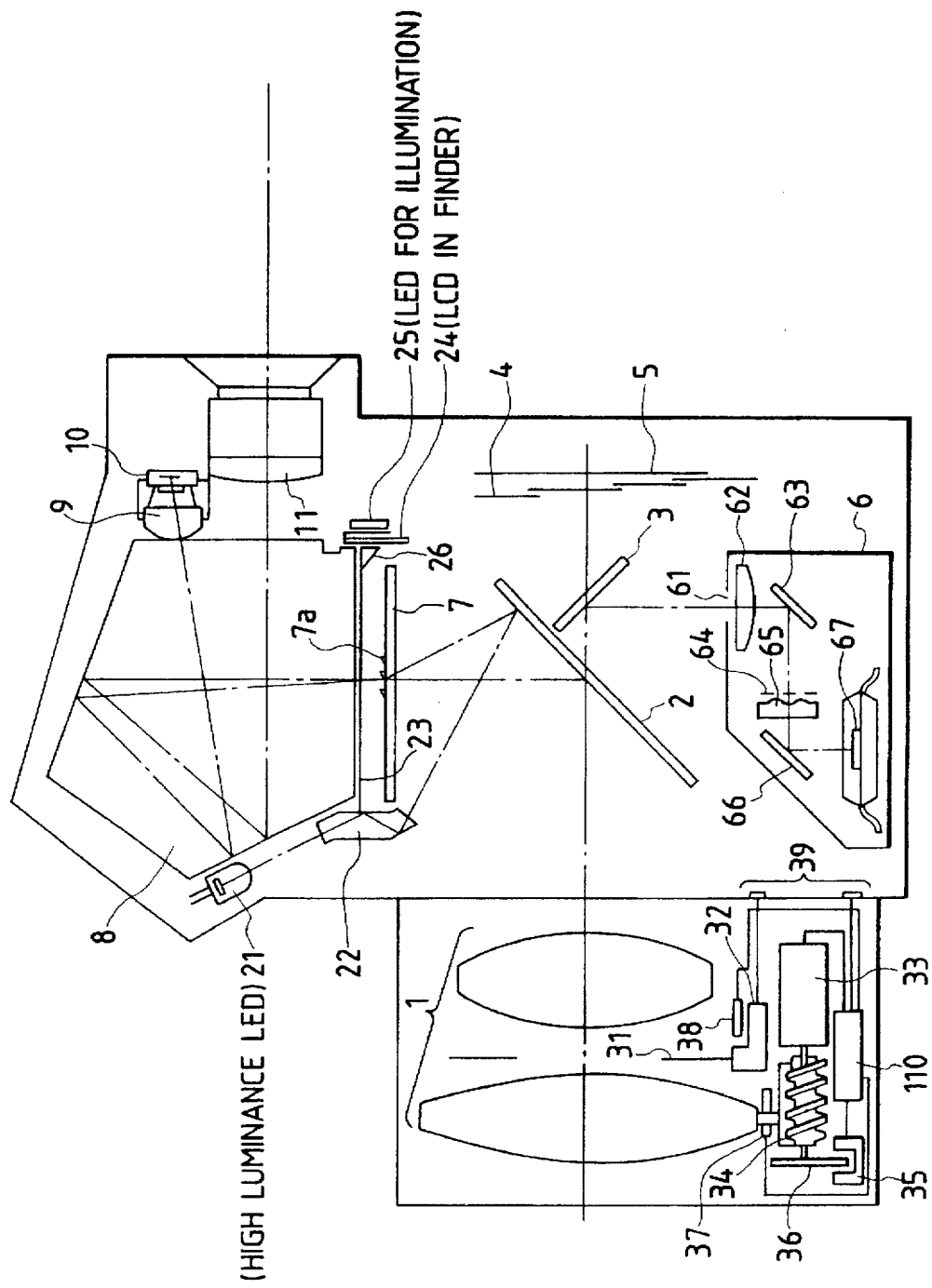
FIG. 1 is a view showing a principal part of the optical arrangement of an automatic focusing camera according to the first embodiment of the present invention.
Figure 2:
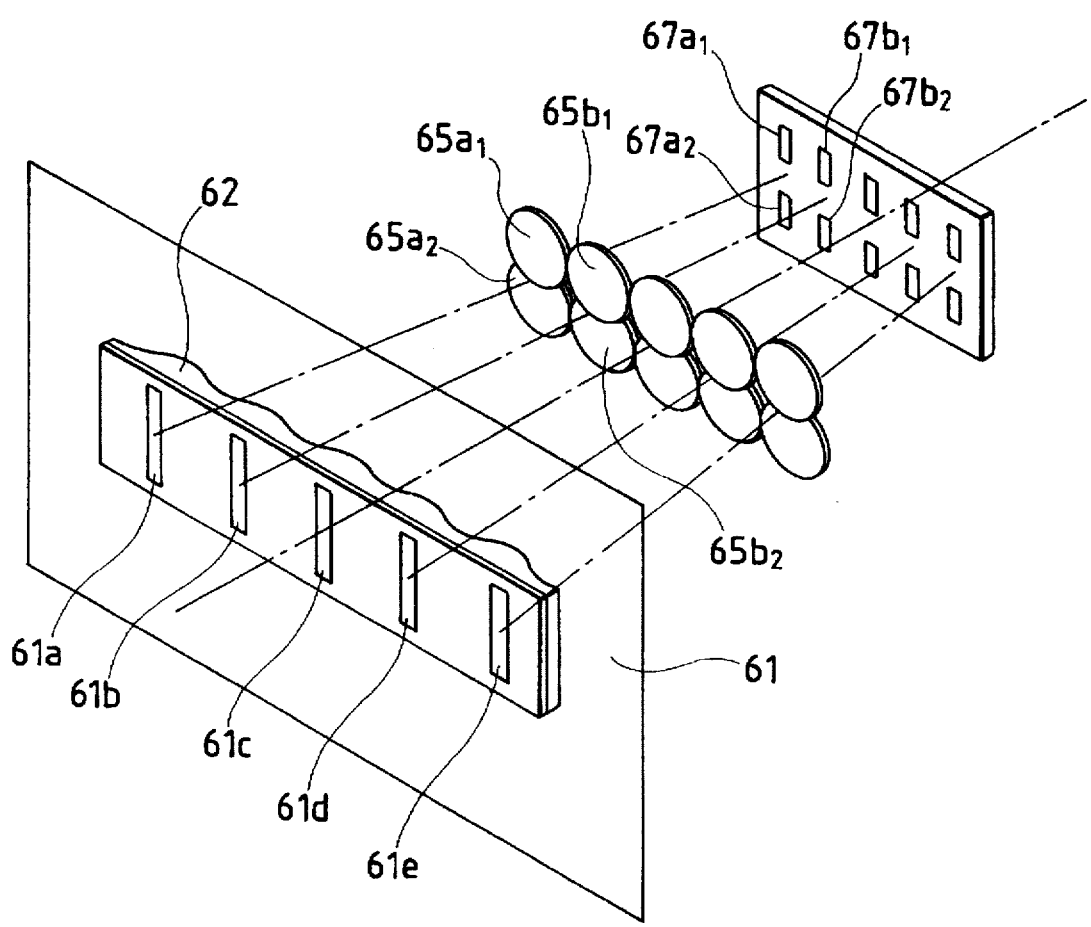
FIG. 2 is a perspective view showing a principal part of a focus detection device shown in FIG. 1.
Figure 3:
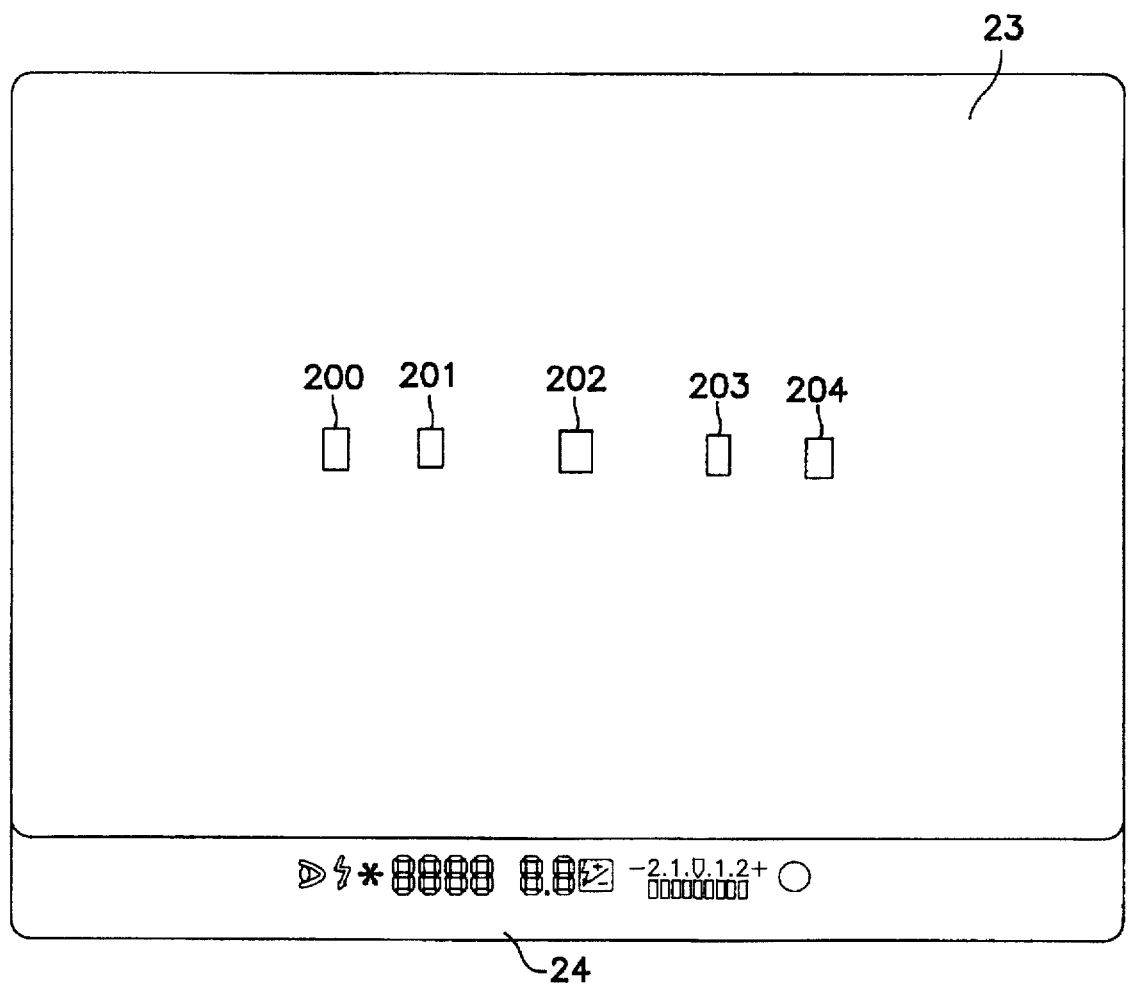
FIG. 3 is a view showing the display state in the finder of the camera shown in FIG. 1.

FIG. 1 is a view showing a principal part of the first embodiment in which the present invention is applied to a single-lens reflex camera, FIG. 2 is a view for explaining the principle of a focus detection device 6 shown in FIG. 1, and FIG. 3 is a view showing the field of view in the finder of the single-lens reflex camera.

Referring to FIG. 1, a photographing lens 1 is constituted by two lenses for the sake of simplicity, but is constituted by a larger number of lenses in practice. A main mirror 2 is obliquely inserted or retracted into or from the photographing optical path in correspondence with the observation state of an object image or the photographing state of the object image. A sub mirror 3 reflects a light beam transmitted through the main mirror 2 toward a focus detection device 6 (to be described later) arranged in a lower portion of the camera body.

A shutter 4 and a light sensitive member 5 are arranged behind the sub mirror 3. The light sensitive member 5 may comprise a silver halide film, a solid-state image pickup element such as a CCD, a MOS type element, or the like, or an image pickup tube such as a vidicon.

The focus detection device 6 is constituted by a field mask 61 arranged near the imaging surface, a field lens 62, reflection mirrors 63 and 66, a secondary imaging lens 65, an aperture 64, a line sensor 67 constituted by a plurality of CCDs, and the like.

The focus detection device 6 of this embodiment performs focus detection by a known phase difference method. As shown in FIG. 3, the device 6 uses a plurality of regions (five regions 200 to 204) in the observation frame (in the finder field) as focus detection points, and allows focus detection at these focus detection points.

The focus detection principle based on the phase difference method of the focus detection device 6 will be described below with reference to FIG. 2.

The field mask 61 arranged near the prospective imaging surface has focus detection fields 61a to 61e defined by five openings, and a known focus detection system is constituted for each field. For example, an imaging light beam passing through the rectangular field mask opening of the focus detection field 61a at the left end in FIG. 2 is deflected by a left-end lens portion of an integrally formed composite field lens 62 disposed behind the field mask 61, and is incident on a pair of secondary imaging lenses $65a_1$ and $65a_2$. Note that an aperture (not shown; corresponding to 64 in FIG. 1) is arranged in front of the secondary imaging lenses. A light beam transmitted through the secondary imaging lens $65a_1$ re-forms an optical image of the focus detection field 61a on a line sensor 67a₁. On the other hand, a light beam transmitted through the secondary imaging lens 65a₂ re-forms an optical image of the focus detection field 61a on a line sensor 67a₂. Since an optical image of the aperture (not shown) near the secondary imaging lenses is formed substantially at the exit pupil position of the photographing lens 1 by the field lens 62, a so-called pupil-split focus detection device is constituted by the above-mentioned optical system. In the system shown in FIG. 2, such devices are arranged in correspondence with five positions, and some integrally manufacturable members are structurally integrated.

Referring back to FIG. 1, a focusing plate 7 is disposed on the prospective imaging surface of the photographing lens 1, and a pentagonal prism 8 is used for bending the finder optical path. An imaging lens 9 and a photometric sensor 10 are used for measuring the object luminance in the observation frame. The imaging lens 9 defines a conjugate relationship between the focusing plate 7 and the photometric sensor 10 via the reflection optical path in the pentagonal prism 8. An eyepiece lens 11 is disposed behind the exit surface of the pentagonal prism 8, and is used for observing the finder field in an enlarged scale.

The main mirror 2, the focusing plate 7, the pentagonal prism 8, and the eyepiece lens 11 constitute a finder optical system.

High-luminance superimposed LEDs 21 emit light that can be visually observed even in a bright object. The light emitted by each LED 21 is reflected by the main mirror 2 via a light projection prism 22, is perpendicularly bent by a corresponding micro-prism array 7a formed on the display portion of the focusing plate 7, and reaches an eye 15 of a photographer via the eyepiece lens 11.

The micro-prism arrays 7a are formed in a frame pattern at a plurality of positions (focus detection points) corresponding to focus detection regions on the focusing plate 7, and are illuminated with light emitted by the corresponding five superimposed LEDs 21 (to be respectively referred to as LED-L1, LED-L2, LED-C, LED-R1, and LED-R2 hereinafter).

With this arrangement, as can be seen from the finder field shown in FIG. 3, the focus detection points (marks) 200, 201, 202, 203, and 204 shine in the finder field, and can display the focus detection regions (this display operation will be referred to as a superimposed display hereinafter).

A field mask 23 defines a finder field region. An LCD 24 in the finder is used for displaying photographing information on a portion outside the finder field, and is illuminated with light emitted by an LED (F_LED) 25 for illumination.

Light transmitted through the LCD 24 in the finder is guided to the portion outside the finder field by a triangular prism 26 (see FIG. 1), as shown in FIG. 3, and a photographer can read various kinds of photographing information.

The photographing lens 1 includes an aperture 31, an aperture driver 32 including an aperture driving circuit 111 (to be described later), a lens driving motor 33, and a lens driving member 34 comprising, e.g., a driving gear, and the like. A photocoupler 35 detects the rotation of a pulse plate 36 interlocked with the lens driving member 34, and supplies the detected information to a focus adjustment circuit 110. The focus adjustment circuit 110 drives the lens driving motor 33 by a predetermined amount on the basis of this information and lens driving amount information supplied from the camera side, thereby moving the photographing lens 1 to an in-focus position.

A distance information code plate 37 is arranged for detecting the position of the photographing lens 1 and obtaining the distance information from the camera to an object. The code plate 37 has a code pattern which indicates, e.g., a range from the closest-distance position to the infinity position by 4 bits in many cases, and can detect the object distance at an in-focus position using a brush contact (not shown). A focal length information code plate 38 is used for detecting the focal length of the photographing lens 1, and allows detection of the focal length information in correspondence with the zooming movement of the lens using a brush contact (not shown). Both the code plates 37 and 38 are connected to the lens focus adjustment circuit 110. A mount contact 39 serves as a known interface between the camera and the lens.

Figure 4A:
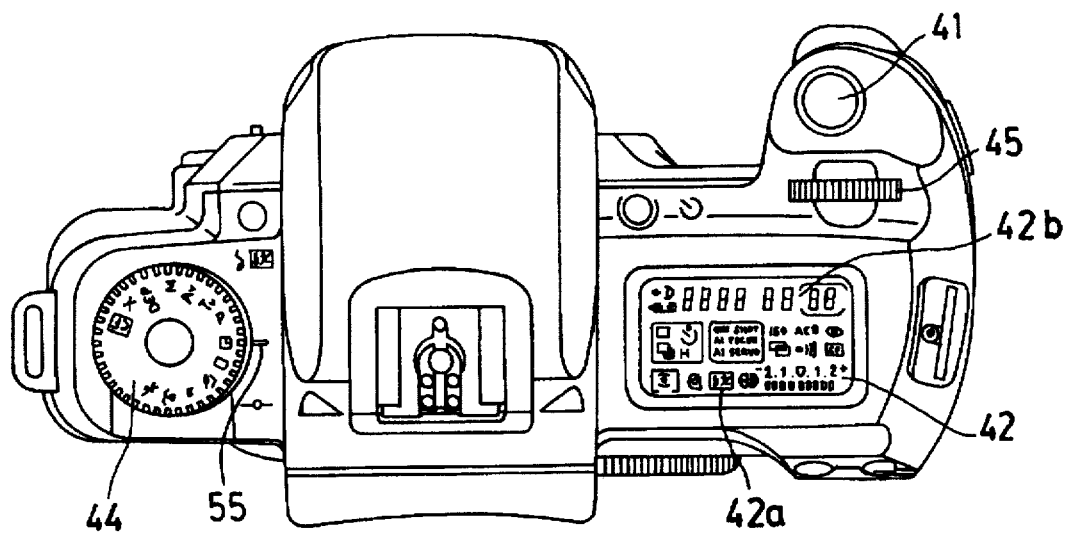
FIGS. 4A and 4B are respectively a top view and a rear view of the camera shown in FIG. 1.
Figure 4B:
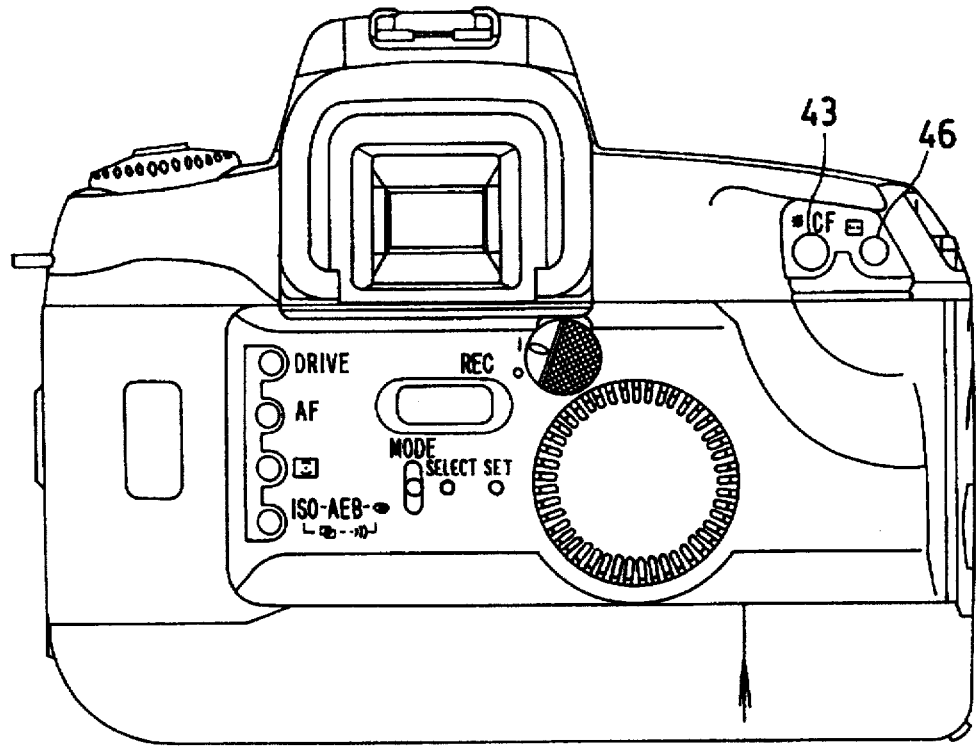

FIGS. 4A and 4B are respectively a top view and a rear view of the single-lens reflex camera with the above-mentioned arrangement.

In FIG. 4A, a release button 41 is arranged on the upper surface of the camera. An LCD 42 for a monitor serves as an external monitor display device, and is constituted by a fixed segment display portion 42a for displaying predetermined patterns, and a 7-segment display portion 42b for displaying variable numeric values. An AE lock button 43 is used for holding a photometry value, and a mode dial 44 is used for selecting, e.g., a photographing mode.

The mode dial 44 will be described in detail below with reference to FIG. 5.

The mode dial 44 has a lock position 44a for disabling the camera, and an automatic photographing mode position 44b at which the camera is controlled based on preset photographing programs and operation functions. The position 44b includes a position 44c of a full auto mode as an automatic photographing mode having a function of resetting arbitrary preset photographing contents. At this position, the above-mentioned line-of-sight detection is not performed. An image zone 44d is preset with photographing programs suitable for scenes expressed by icons. More specifically, the image zone 44d is preset with four different photographing programs, i.e., a portrait mode suitable for a portrait photographing operation, a landscape mode suitable for scenery or a commemoration photographing operation, a close up mode suitable for a close up photographing operation, and a sport mode suitable for a moving body picture.

A position 44e of a manual photographing mode allows the photographer to set the photographing contents, and has program AE, shutter-priority AE, aperture-priority AE, manual exposure, object depth-priority AE, and synchronous photographing modes. An index 55 indicates the selected position. At a position 44f of a custom function mode, a so-called custom function which allows the photographer to select and use preset functions of the camera is set.

Referring back to FIG. 4, an electronic dial 45 is used for selecting a setting value that can be further selected in a mode selected by the mode dial 44 by generating click pulses when it is turned. For example, when the photographer selects the shutter-priority AE photographing mode using the mode dial 44, the currently set shutter speed is displayed on the LCD 24 in the finder and the LCD 42 for the monitor. When the photographer turns the electronic dial 45 upon observation of this display, the currently set shutter speed changes in turn in accordance with the turned direction. A focus detection point selection button 46 is used for selecting desired ones of the plurality of the focus detection points 200 to 204 in the frame to be used in focus detection. This operation will be described in detail later.

FIGS. 6A and 6B are block diagrams showing the electrical arrangement built in the single-lens reflex camera with the above-mentioned arrangement. The same reference numerals in FIGS. 6A and 6B denote the same parts as in FIG. 1.

A central processing unit (to be referred to as a CPU hereinafter) 100 of a microcomputer built in the camera main body is connected to a photometric circuit 102, an automatic focus detection circuit 103, a signal input circuit 104, an LCD driving circuit 105, an LED driving circuit 106, a shutter control circuit 108, and a motor control circuit 109. The CPU 100 exchanges signals with the focus adjustment circuit 110 and the aperture driving circuit 111 disposed in the photographing lens 1 via the mount contact 39 shown in FIG. 1.

An EEPROM 100a connected to the CPU 100 has a function of storing information arbitrarily set by a photographer as storage means.

Figure 7:
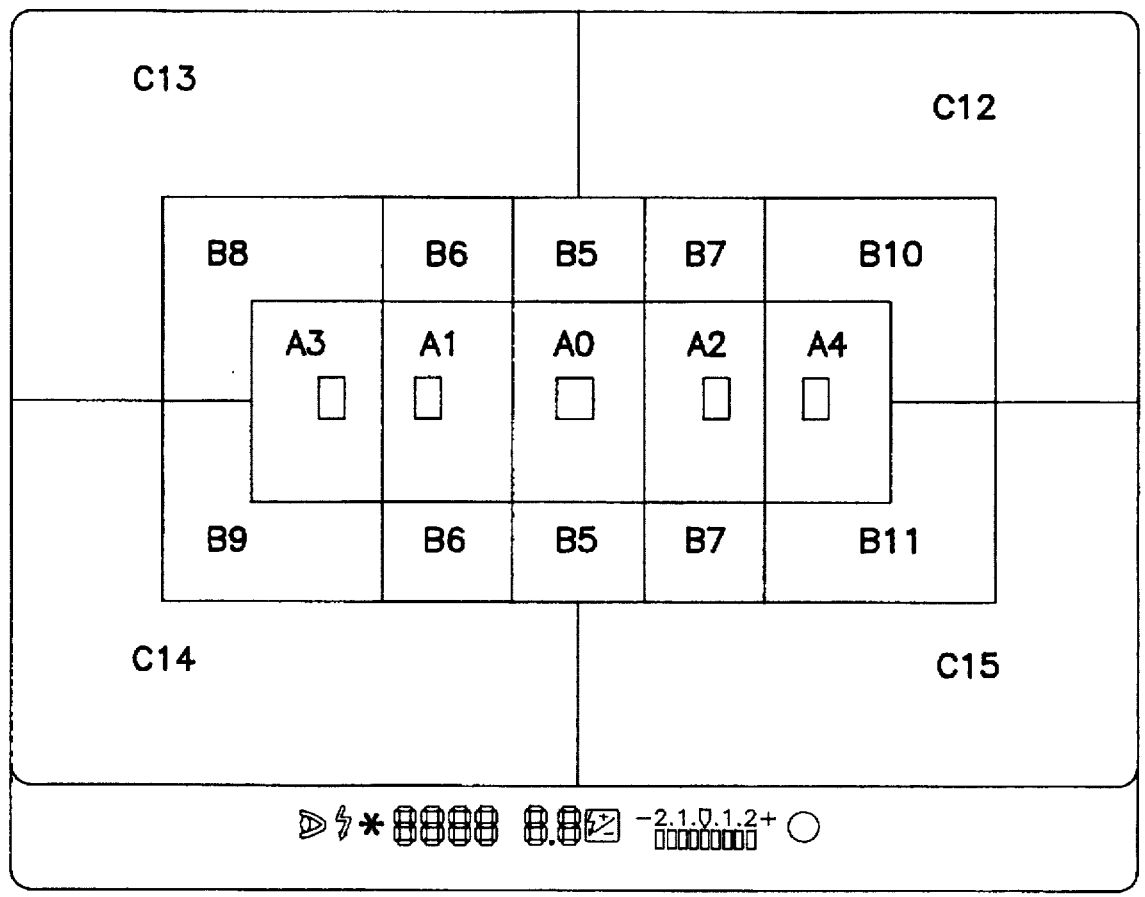
FIG. 7 is a view for explaining the photometry regions of the camera shown in FIG. 1.

The photometric circuit 102 amplifies, log-compresses, and A/D-converts signals from the respective portions of the photometric sensor 10, and transmits the processed signals as luminance information of each sensor portion. The photometric sensor 10 is constituted by 16-divided photodiodes SPC-0 to SPC-15, and performs a photometry operation of the object luminances of 16-divided regions A0 to C15 of the observation frame, as shown in FIG. 7.

Note that the photometry operation of the region A3 including the focus detection point 200 at the left end in FIG. 3 is performed by the photodiode SPC-3, the region A1 including the second focus detection point 201 from the left end is performed by the photodiode SPC-1, and similarly, the photometry operations of the regions A0, A2, and A4 including the focus detection points 202 to 204 are respectively performed by the photodiodes SPC-0, SPC-2, and SPC-4. The photometry operations of the regions B5 to B11 around the above-mentioned regions are performed by the photodiodes SPC-5 to SPC-11, and the photometry operations of the outermost regions C12 to C15 are performed by the photodiodes SPC-12 to SPC-15.

The line sensor 67 is a known CCD line sensor constituted by five line sensors CCD-L2, CCD-L1, CCD-C, CCD-R1, and CCD-R2 corresponding to the five focus detection points 200 to 204 in the frame, as shown in FIG. 3 above.

The automatic focus detection circuit 103 A/D-converts a voltage obtained from the line sensor 67, and supplies the converted voltage to the CPU 100.

A switch SW-1 is turned on at the first stroke position of the release button 41, and starts, e.g., photometry or AF control. A release switch SW-2 is turned on at the second stroke position of the release button 41. Switches SW-AEL and SW-AFSEL are respectively turned on when the AE lock button 43 and the focus detection point selection button 46 are depressed. Dial switches SW-DIAL1 and SW-DIAL2 are arranged in the above-mentioned electronic dial 45, and their outputs are input to an up-down counter in the signal input circuit 104 to count the rotation click amount of the electronic dial 45. In addition, dial switches SW-M1 to SW-M4 are arranged in the above-mentioned mode dial 44.

The state signals of these switches are input to the signal input circuit 104, and are then transmitted to the CPU 100 via a data bus.

The LCD driving circuit 105 comprises a known arrangement for display-driving LCDs as liquid crystal display elements, and can simultaneously display the aperture value, shutter speed, selected photographing mode, and the like on both the LCD 42 for the monitor and the LCD 24 in the finder in accordance with a signal from the CPU 100.

The LED driving circuit 106 ON/OFF-controls the LED (F_LED) 25 for illumination and the superimposed LEDs 21.

The shutter control circuit 108 controls magnets MG-1 and MG-2 for respectively traveling forward and rearward shutters upon energization to expose the light sensitive member to light of a predetermined amount. The motor control circuit 109 controls a motor M1 for winding and rewinding a film, and a motor M2 for charging the main mirror 2 and the shutter 4. The shutter control circuit 108 and the motor control circuit 109 realize a series of release sequences of the camera.

Figure 8:
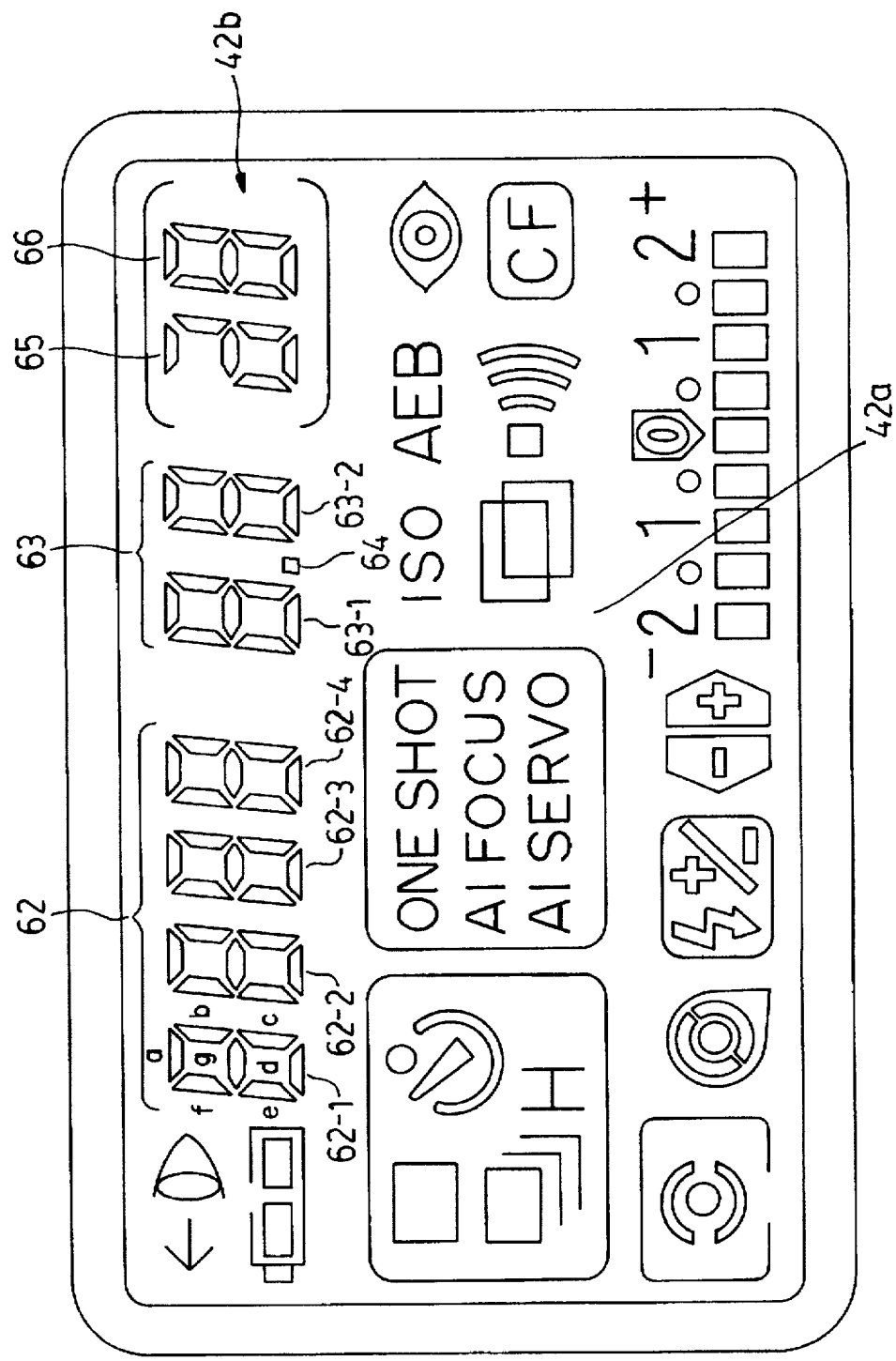

FIG. 8 shows the contents of all the display segments on the LCD 42 for the monitor shown in FIG. 4.

Referring to FIG. 8, the fixed segment display portion 42a has known photographing mode display marks. The 7-segment display portion 42b for displaying variable numeric values is constituted by a 4-digit 7-segment portion 62 for displaying the shutter speed, a 2-digit 7-segment portion 63 and a decimal point portion 64 for displaying the aperture value, a limited numeric value display segment portion 65 and a 1-digit 7-segment portion 66 for displaying the film count, and the like.

The operation executed upon depression of the above-mentioned focus detection point selection button 46 will be described below.

FIGS. 9A to 9I respectively show the display states on the LCD 42 for the monitor when the focus detection point detection state is set upon depression of the focus detection point selection button 46.

Figure 9A:
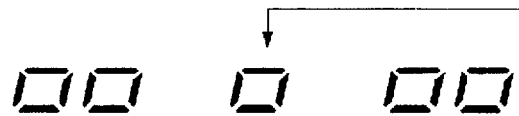
FIGS. 9A to 9I are views for explaining the selection of a focus detection point zone in the first embodiment of the present invention.

FIG. 9A shows the display state upon selection of an "all focus detection point zone" mode in which all the five focus detection points are enabled. "☐" patterns are displayed using segments c, d, e, and g of a total of five 7-segment elements, i.e., the 7-segment elements of the fourth (62-1), third (62-2), and first (62-4) digits in the 7-segment portion 62 shown in FIG. 8 and of the 7-segment elements of the second (63-1) and first (63-2) digits of the 7-segment portion 63 shown in FIG. 8, thus indicating that all the focus detection points 200 to 204 are selected.

Figure 9B:
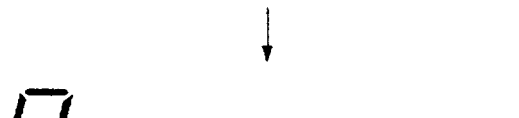
Figure 9C:
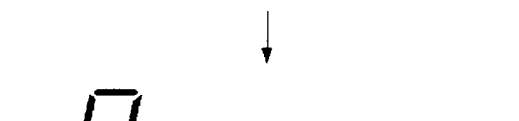
Figure 9D:
Figure 9E:
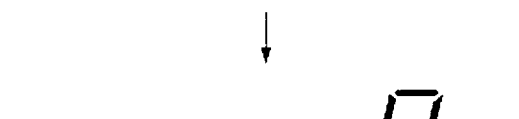
Figure 9F:

When the electronic dial 45 is rotated clockwise by one click, the display state is switched to that shown in FIG. 9B. FIG. 9B shows the display state upon selection of a "single focus detection point zone" mode in which only the focus detection point 200 at the left end of the five focus detection points is enabled. The segments c, d, e, and g of only the 7-segment element 62-1 are turned on, and only the segments d, of the other 7-segment elements 62-2, 62-4, 63-1, and 63-2 are turned on, thus indicating that only the focus detection point 200 at the left end is selected, and the other focus detection points are disabled.

Similarly, each time the electronic dial 45 is rotated clockwise by one click, the display states are switched in turn, as shown in FIGS. 9C to 9F, thus selecting the "single focus point detection zone" modes for respectively enabling the focus detection points 201, 202, 203, and 204.

In this manner, in the "single detection point zone" mode, only one of all the focus detection points is enabled.

Figure 9G:
Figure 9H:

When the electronic dial 45 is further rotated clockwise by one click, the display state is switched to the one shown in FIG. 9G. FIG. 9G shows the display state of a "partial focus detection point zone" mode in which the focus detection point 200 at the left end and the second focus detection point 201 from the left end of the five focus detection points are enabled. In this state, the focus detection point selection marks are displayed by the 7-segment elements 62-1 and 62-2 to indicate that the focus detection points 200 and 201 are selected, and the focus detection point disabled marks are displayed by the 7-segment elements 62-4, 63-1, and 63-2 to indicate that the focus detection points 202, 203, and 204 are disabled. When the electronic dial 45 is further rotated clockwise by one click, the display state is switched to the one shown in FIG. 9H, and another "partial focus detection point zone" mode in which the focus detection points 201, 202, and 203 are enabled can be selected.

Figure 9I:
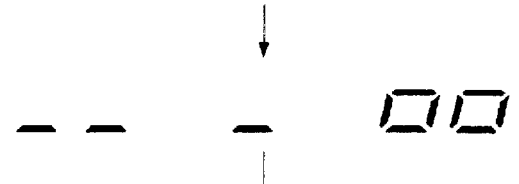

When the electronic dial 45 is further rotated clockwise by one click, the display state is switched to the one shown in FIG. 9I, and still another "partial focus detection point zone" mode in which the focus detection points 202, 203, and 204 are enabled can be selected.

In this manner, in the "partial focus detection point zone" mode, two or more focus detection points of all the focus detection points are enabled.

When the electronic dial 45 is further rotated clockwise by one click from the state shown in FIG. 9I, the display state returns to the first display state shown in FIG. 9A in which the "all focus detection point zone" mode is selected.

In this embodiment, a case has been described wherein the electronic dial 45 is rotated clockwise. When the electronic dial 45 is rotated counterclockwise, the display states are switched in the order opposite to that upon clockwise rotation, needless to say. Also, the selected focus detection point zone is stored in the EEPROM 100a, needless to say.

Note that the focus detection point zone is displayed using the LCD 42 for the monitor. Simultaneously or independently, a similar display may be made on the LCD 24 in the finder, or the focus detection points 200 to 204 may shine to superimpose-display the above-mentioned marks in the finder.

Figure 10:
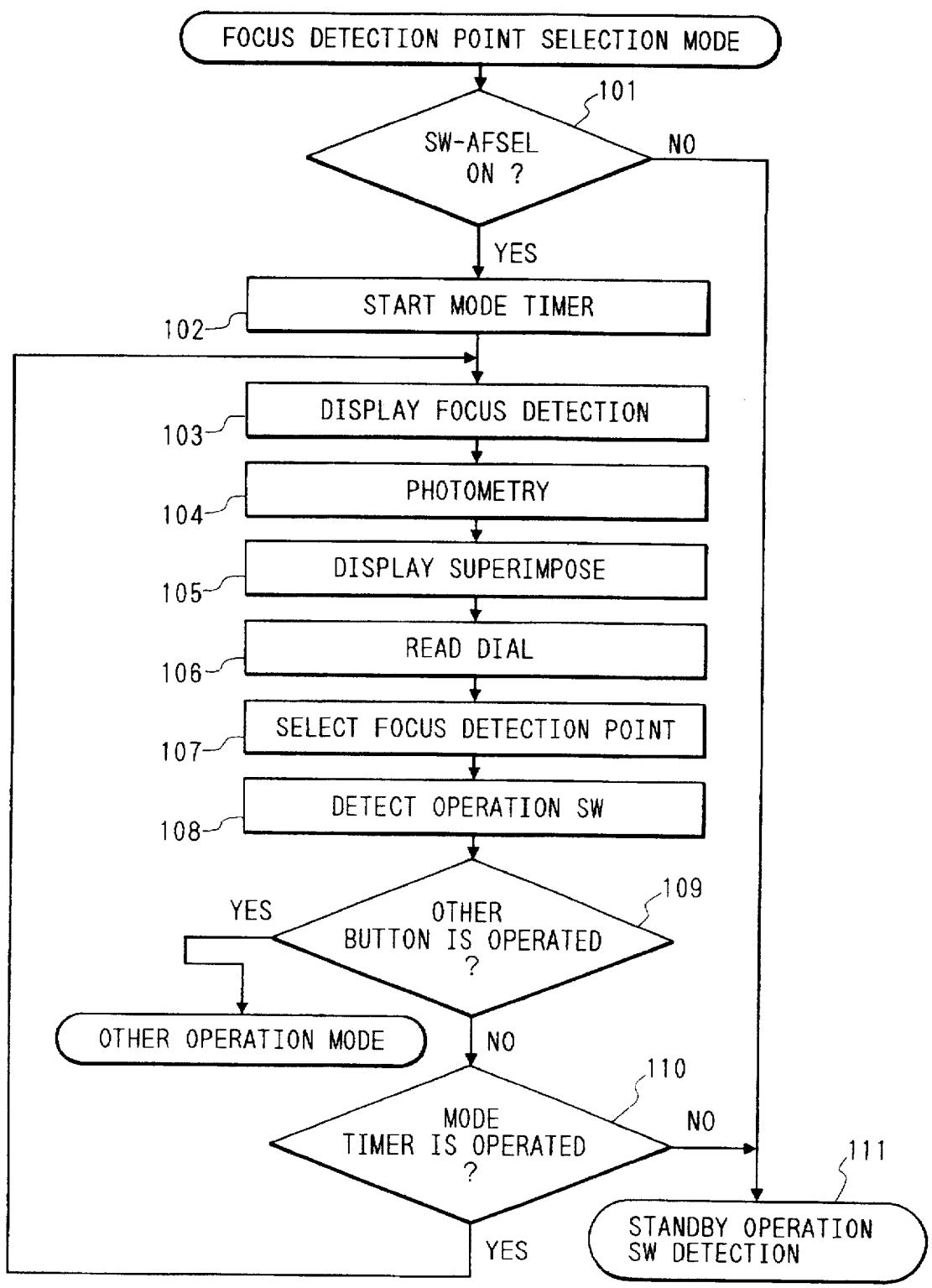
FIG. 10 is a flow chart showing the operation in a focus detection point selection mode in the first embodiment of the present invention.

FIG. 10 is a flow chart showing the operation of the above-mentioned "focus detection point selection mode" for selecting a focus detection point zone upon depression of the focus detection point selection button 46.

The camera performs state detection of various operation switches in a standby state, and it is checked in step 101 if the switch SW-AFSEL whose state changes in response to the operation of the focus detection point selection button 46 is ON. If YES in step 101, the flow advances to step 102. On the other hand, if NO in step 101, the control returns to the standby state to continue the state detection of the various operation switches.

When the switch SW-AFSEL is ON, the flow advances to step 102, and a mode timer is started. In step 103, the focus detection point (or points) of the currently selected focus detection point zone is displayed on the LCD 42 for the monitor. In step 104, the photometry operation of the photometry region corresponding to the selected focus detection point is performed to perform a superimposed display in the next step 105. In step 105, the superimposed LEDs 21 are turned on at a duty ratio (so-called luminance modulation) corresponding to the photometric value in step 104, thus superimpose-displaying the selected focus detection point.

In step 106, the contents of the up-down counter are read via the signal input circuit 104, i.e., the rotation click amount of the electronic dial 45 is read. In step 107, a focus detection point zone is selected in accordance with the read value, as described above (FIGS. 9A to 9I). In this case, as in steps 103 to 105, the focus detection point (or points) of the selected focus detection point zone is displayed using the LCD 42 for the monitor and the superimposed display in the finder.

Other operation switches are detected in step 108, and it is checked in step 109 if another button is operated. If YES in step 109, the corresponding operation mode is selected. If NO in step 109, the flow advances to step 110 to check if the mode timer of about 6 sec has reached a time-out state. If the mode timer is operating, the flow returns to step 103 to repeat the operations in steps 103 to 108 above. On the other hand, if the mode timer has reached a time-out state, the flow advances to step 111 to detect other operation switches. That is, the flow escapes from the focus detection point selection mode, and the camera is set in the standby state.

As described above, the "all the the focus detection point zone" for enabling all the focus detection points in the frame, the "single focus detection point zones" for enabling only one of all the focus detection points, and the "partial focus point detection point zones" for enabling a plurality of ones of all the focus detection points can be selected.

In this manner, since the photographer can arbitrarily change the size of the focus detection point zone depending on the object, a focusing error on an object other than a principal object due to too broad a focus detection point zone can be prevented, and an accurate focusing operation on a principal object that the photographer intended can be realized. In particular, this function is effective for a portrait photographing operation and a close-up photographing operation.

On the contrary, the principal object can be prevented from deviating from the focus detection point upon movement of the object or by slightly changing the photographing field due to the focus detection point zone including only one point. Since one of a plurality of focus detection points always captures the principal object, an accurate focusing operation on the principal object can be realized.

Since focus detection is performed using limited ones of all the focus detection points, the focus detection time is shortened, and an in-focus state can be attained quickly. In the servo AF mode in which a moving object is traced, the object is always traced using a plurality of ones of all the focus detection points so that the focus detection points change in units of "partial focus detection point zone" in place of being changed one by one in correspondence with the movement of the object. For this reason, the automatic focus detection means which can trace an object satisfactorily and has a high focusing speed can be realized.

Figure 11:
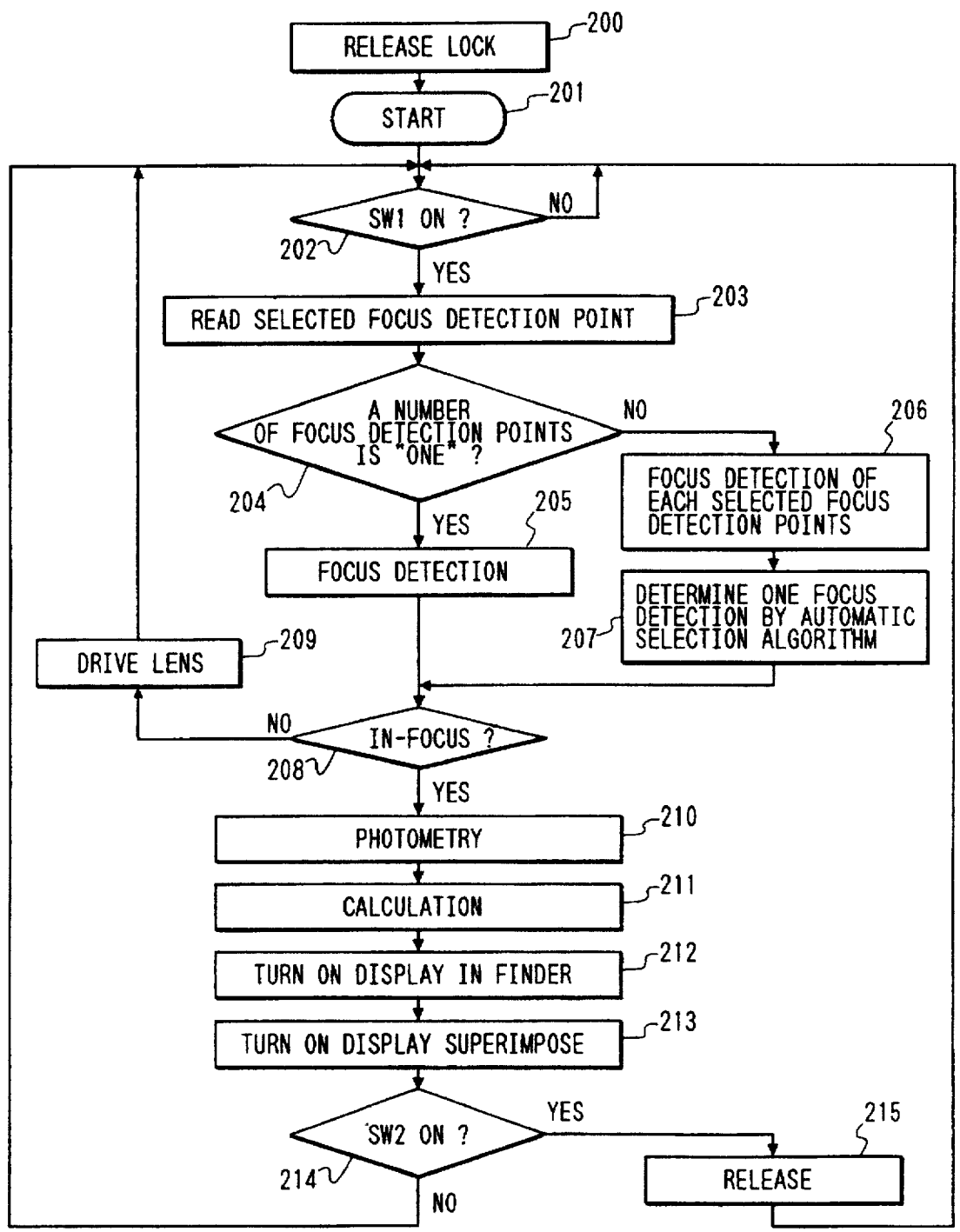
FIG. 11 is a flow chart showing the operation upon releasing of a lock in the first embodiment of the present invention.

The photographing operation of the AF camera in which a focus detection point zone is selected as described above will be described below with reference to the flow chart in FIG. 11.

When the mode dial 44 of the camera is unlocked in step 200, the camera is set in the operation standby state (the operation switch can be accepted), and the flow starts from step 202 via step 201.

It is checked in step 202 if the switch SW-1 is ON upon depression of the release button 41. If NO in step 202, the flow stays in this state until the switch SW-1 is ON. Thereafter, when the switch SW-1 is turned on, the flow advances to step 203, and the CPU 100 reads the currently selected focus detection point (or points) from the EEPROM 100a.

In step 204, it is checked if the number of read focus detection points is 1. More specifically, it is checked if a "single focus detection point zone" is selected or a "partial focus detection point zone" or the "all focus detection point zone" is selected. As a result, if a "single focus detection point zone" is selected, the flow advances to step 205 to perform focus detection at the one selected focus detection point, and the defocus amount is calculated on the basis of the output from the corresponding CCD.

On the other hand, if a "partial focus detection point zone" or "all focus detection point zone" is selected to enable a plurality of focus detection points, the flow advances to step 206 to perform focus detection at all the selected focus detection points, and the defocus amounts of the respective focus detection points are calculated on the basis of the outputs from the corresponding CCDs. The flow advances to step 207, and one focus detection point which is estimated to correspond to the principal object is determined by a known automatic selection algorithm on the basis of the defocus amount (or amounts) and the absolute distance information to an object from the distance information code plate 37. As is well known, the automatic selection algorithm includes "central focus detection point weighted", "close-distance focus detection point priority", and "large-defocus closest-distance focus detection point exclusion" algorithms.

As described above, a focus detection point to be subjected to an AF operation is determined and the defocus amount is calculated in step 205 or 207. Thereafter, the flow advances to step 208 to check if an in-focus state is attained.

If it is determined in step 208 that the photographing lens 1 has not reached an in-focus state, the flow advances to step 209, and the CPU 100 supplies a signal to the focus adjustment circuit 110 to drive the photographing lens 1 by a predetermined amount corresponding to the defocus amount. The flow returns to step 202 again to perform the series of focus detection operations above. If it is determined in step 208 that an in-focus state is attained, the flow advances to step 210.

In step 210, a signal is transmitted to the photometric circuit 102 to perform a photometry operation. The flow then advances to step 211, and a so-called evaluated photometry calculation in which one of the photometry regions A0, A1, A2, A3, and A4 including the focus detection point in the in-focus state is weighted is performed. For example, when the focus detection point 201 attains an in-focus state, the photometry value is determined on the basis of the following formula which weights the output, A1, from the photometric sensor SPC-1 which performs the photometry operation of the corresponding photometry region A1.

$$Be = [A1 \times 3 + \{(A3 + A0 + B6)/3\} \times 2 + \{(A2 + A4 + B5 + B7 + B8 + B9 + B10 + B11 + C12 + C13 + C14 + C15)/12\} \times 1] \div 6$$

where A0 to A4, B5 to B11, and C12 to C15 represent the outputs from the respective photometry regions.

In step 212, the CPU 100 supplies a signal to the LED driving circuit 106 to turn on the LED (F_LED) 25 for illumination. On the other hand, the LCD driving circuit 105 displays the shutter speed, the aperture value, and the exposure value on the the LCD 24 on the basis of the photometry value calculated in correspondence with the photographing mode selected by the mode dial 44. In step 213, the CPU 100 supplies a signal to the LED driving circuit 106 to turn on the superimposed LED corresponding to the focus detection point that has attained an in-focus state.

In step 214, the state of the release switch SW-2 is checked in turn. If the release switch SW-2 is ON, the flow advances to step 215 to transmit signals to the shutter control circuit 108, the motor control circuit 109, and the aperture driving circuit 111, thus ending a series of release sequence operations.

The release sequence operations will be described in detail below. The motor M2 is energized to move the main mirror 2 upward, and the aperture 31 is stopped down. Thereafter, the magnet MG-1 is energized to release the forward shutter of the shutter 4. The aperture value of the aperture 31 and the shutter speed of the shutter 4 are determined on the basis of the exposure value detected by the photometric circuit 102 and the sensitivity of the film 5. After an elapse of a predetermined shutter time, the magnet MG-2 is energized to close the rearward shutter of the shutter 4. Upon completion of exposure on the film 5, the motor M2 is energized again to move the mirror downward and to charge the shutter, and the motor M1 is also energized to feed the film by one frame, thus ending a series of release sequence operations.

Upon completion of the release sequence, the flow returns to step 202 to repeat the above-mentioned sequence. Also, if it is determined in step 214 that the release switch SW-2 is OFF, the flow returns to step 202. In this embodiment, an AF mode is the servo AF mode for always tracing an object.

Second Embodiment

In the first embodiment, the focus detection point selection button 46 is used for selecting a focus detection point zone, while in the second embodiment, a focus detection point zone selection switch for independently switching between the "single focus detection point zones" and "partial focus detection point zones" is arranged.

Figure 12A:
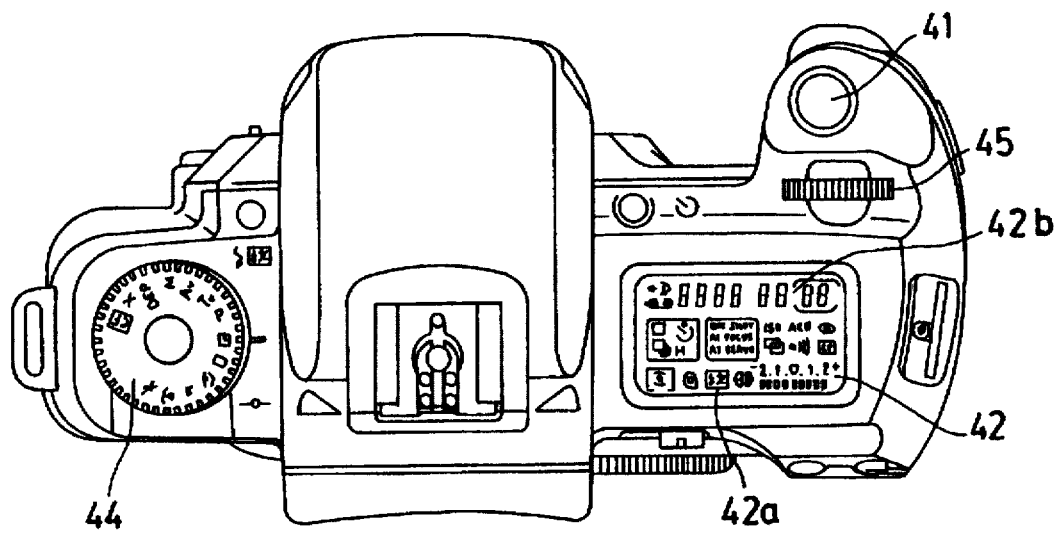
FIGS. 12A and 12B are respectively a top view and a rear view of a camera according to the second embodiment of the present invention.
Figure 12B:
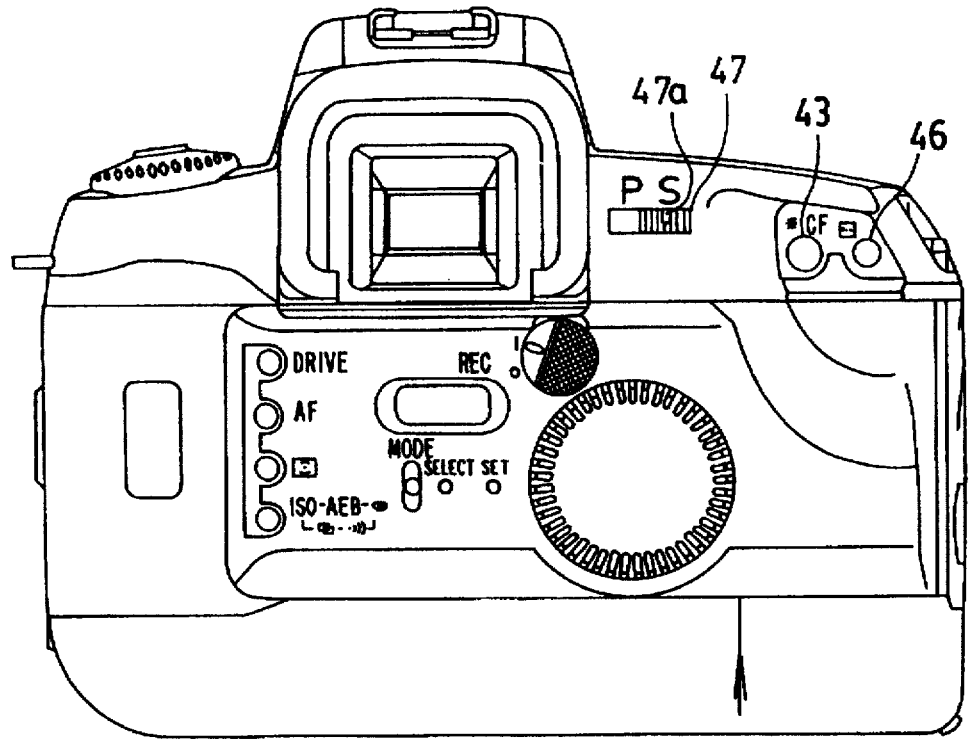
Figure 13B:
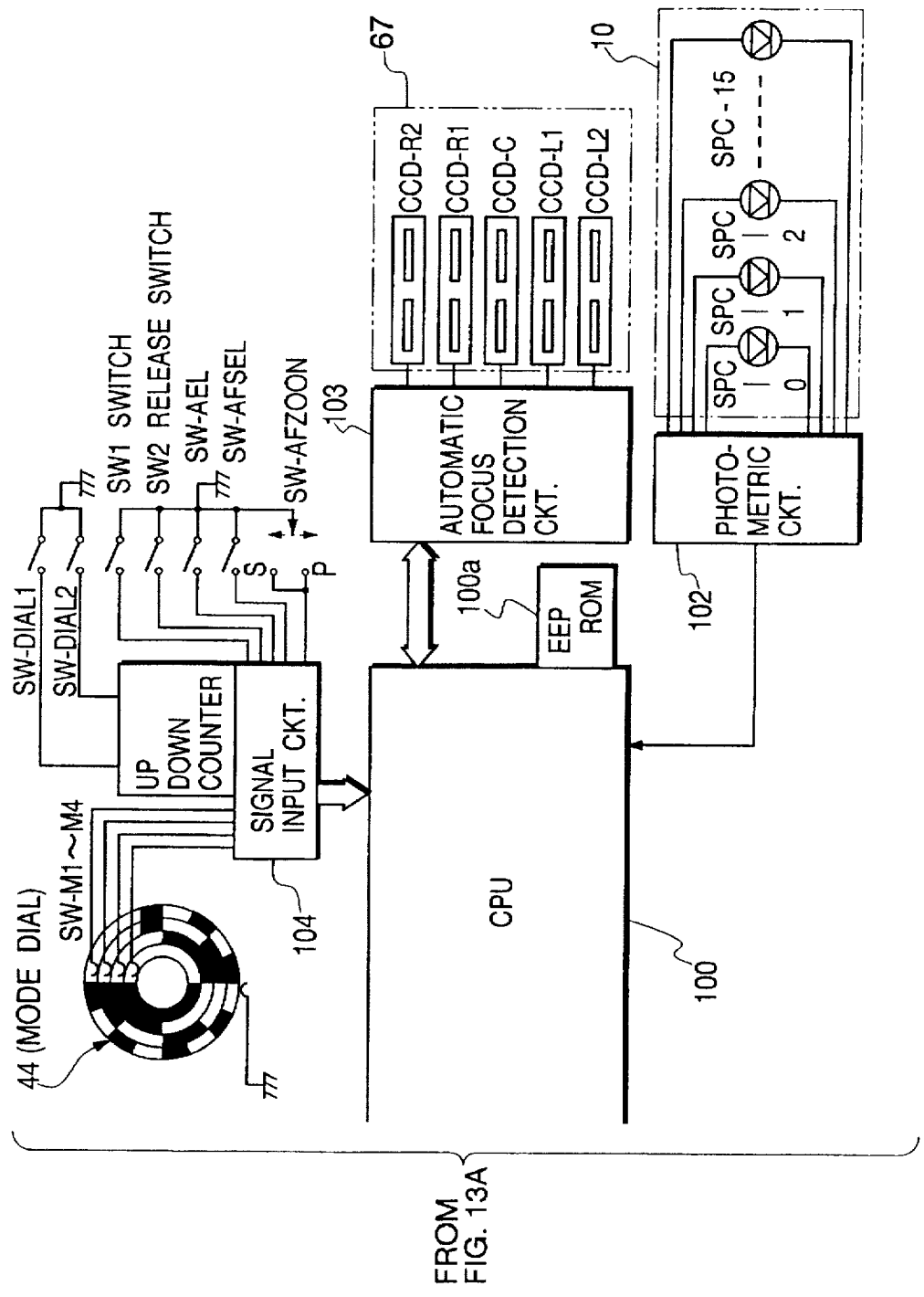
FIG. 13, comprised of FIGS. 13A and 13B, is a block diagram showing the electrical arrangement of the camera shown in FIGS. 12A and 12B.
Figures 15A, 15B, 15C, 15D:
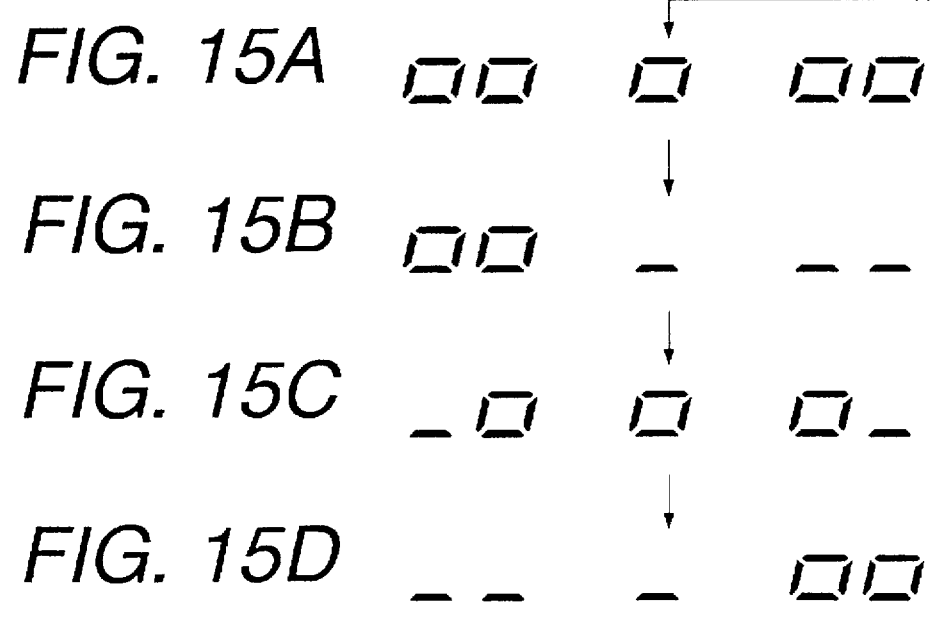
FIGS. 15A to 15D are views for explaining the selection of a focus detection point zone in the second embodiment of the present invention.

FIGS. 12A and 12B and FIGS. 13A and 13B are views associated with the second embodiment in which the present invention is applied to a single-lens reflex camera. FIGS. 12A and 12B are respectively a top view and a rear view of the single-lens reflex camera, and FIGS. 13A and 13B are block diagrams showing principal part of the camera shown in FIGS. 12A and 12B. Note that the same reference numerals in FIGS. 12A, 12B, 13A and 13B denote the same parts as in FIGS. 4A, 4B, 6A and 6B in the first embodiment, and a detailed description thereof will be omitted.

Referring to FIGS. 12A and 12B, a focus detection point zone selection switch 47 as mentioned above comprises a slide switch. Referring to FIGS. 13A and 13B, the focus detection point zone selection switch 47 is represented by SW-AFZOON, and its switch state signal is input to the signal input circuit 104 as in other operation switches.

When an index 47a of the focus detection point zone selection switch 47 is located at a position "S", as shown in FIG. 12B, it indicates that a "single focus detection point zone" is selected as the focus detection point zone. When the focus detection point selection button 46 is depressed in this state, the display state on the LCD 42 for the monitor changes, as shown in FIGS. 14A to 14F, and a total of six different focus detection zones, i.e., the "all focus detection point zone" and the five "single focus detection point zones" as in the first embodiment (FIGS. 14B to 14F correspond to FIGS. 9B to 9F) can be selected upon operation of the electronic dial 45.

In the following description, the currently selected focus detection point will be explained with reference to the display state of the 7-segment display portion 42b on the LCD 42 for the monitor.

In FIG. 12A, when the index 47a of the focus detection point zone selection switch 47 is located at a position "P", it indicates that a "partial focus detection point zone" is selected as the focus detection point zone. When the focus detection point selection button 46 is depressed in this state, the display state on the LCD 42 for the monitor changes, as shown in FIGS. 15A to 15D, and a total of four different focus detection point zones, i.e., the "all focus detection point zone" and the three "partial focus detection point zones" as in the first embodiment (FIGS. 15B to 15D correspond to FIGS. 9G to 9I; these zones will be referred to as "partial focus detection point zones (A)" hereinafter) can be selected upon operation of the electronic dial 45.

As described above, since the focus detection point zone selection switch 47 is arranged, a photographer can initially select a middle or small range to be subjected to the distance measurement in correspondence with a photographing scene using the focus detection point zone selection switch 47. As compared to the first embodiment in which the photographer must select one out of nine different zones shown in FIGS. 9A to 9I, the operation sequence can be simplified, and it is easy to alternately switch between the "partial focus detection point zones" and the "single focus detection point zones".

Third Embodiment

The third embodiment of the present invention, which relates to selection of a focus detection point zone of the present invention, will be described below. Note that the mechanical and electrical arrangements are the same as those in the second embodiment, and a detailed description thereof will be omitted.

In the third embodiment, the focus detection point zone is switched in a so-called custom function mode in which a photographer can select and use preset functions of the cameras.

Figures 16A, 16B, 16C, 16D, 16E, 16F:
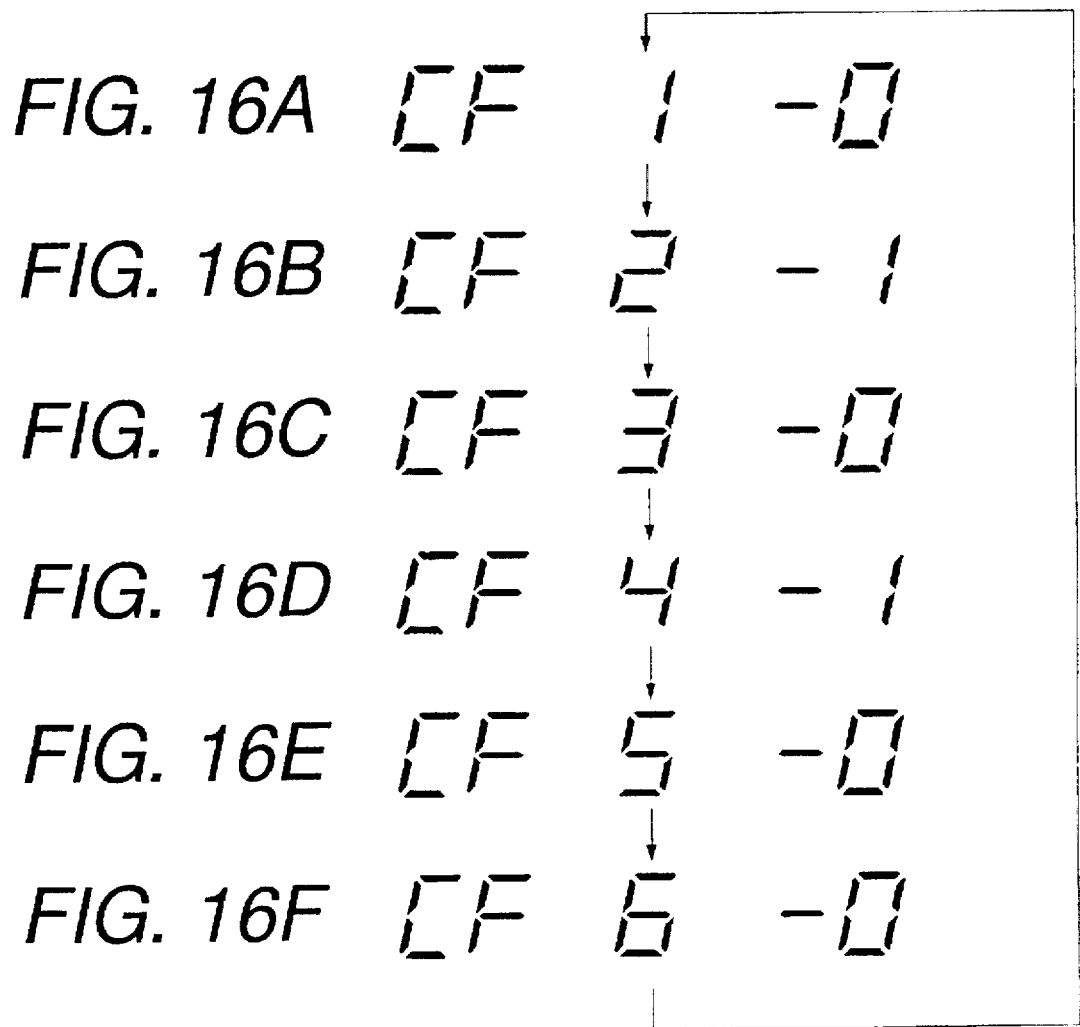
FIGS. 16A to 16F are views for explaining a custom function mode in the third embodiment of the present invention.

When the mode dial 44 is turned to be unlocked from the lock position, and the mark 44f of the custom function mode is adjusted to the index 55 (see FIGS. 4A and 5), "CF1-0" is displayed on the LCD 42 for the monitor using the 7-segment portion 62 for displaying the shutter speed and the 7-segment portion 63 for displaying the aperture value, as shown in FIG. 16A. When the 7-segment portion 63 displays "0", a function preset in "CF No." displayed on the 7-segment portion 62 is disabled; when the 7-segment portion 63 displays a numeric value other than "0", the corresponding function is enabled.

When the electronic dial 45 (see FIG. 4A) is turned in this state, "CF No." and its setting condition change in the order of FIG. 16A→FIG. 16B→FIG. 16C→FIG. 16D→FIG. 16E→FIG. 16F→FIG. 16A.

In this case, whether or not one of six different functions "CF1" to "CF6" is "enabled" or "disabled" (indicated by "1" or "0"), or one of a plurality of functions can be selected.

For example, in the function "CF1", one of a plurality of different "focus detection point zone modes" can be selected. In the function "CF2", whether the leader portion of a film is or is not rewound into the patrone upon rewinding of the film can be selected.

The selection of a focus detection point zone will be described below. In the state shown in FIG. 16A, since the 7-segment portion 63 displays "0", focus detection point zones, which correspond to FIGS. 14A to 14F and consist of the "all focus detection point zone" and the above-mentioned "single focus detection point zones", are set as a "default focus detection zone mode".

Figures 17A, 17B, 17C, 17D:
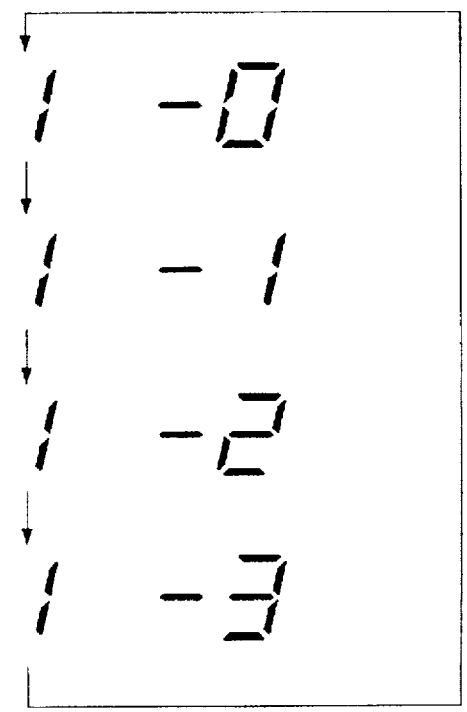
FIGS. 17A to 17D are views for explaining the selection of a focus detection point zone in a predetermined custom function mode in FIGS. 16A to 16F.
Figures 18A, 18B, 18C, 18D, 18E:
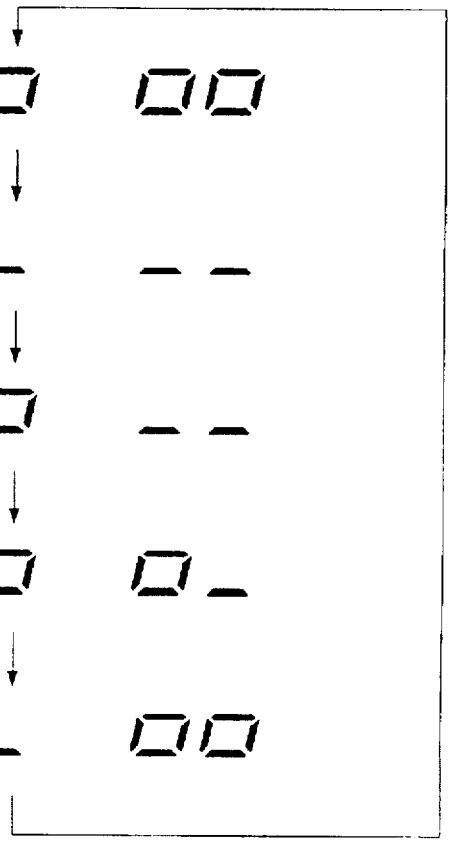
FIGS. 18A to 18E are views showing the states of the focus detection point zones selected in the respective states shown in FIGS. 17A to 17D.

When the AE lock button (SW-AEL) 43 is depressed in this state, the display on the 7-segment portion 63 is switched to "1", as shown in FIG. 17B. In this case, focus detection point zones, which correspond to FIGS. 15A to 15D and consist of the "all focus detection point zone" and the above-mentioned "partial focus detection point zones (A)", are set as a "first focus detection point zone mode".

When the AE lock button 43 is depressed again, the display on the 7-segment portion 63 is switched to "2", as shown in FIG. 17C. In this case, the "all focus point detection point zone" and "partial focus detection point zones (B)" which have different combinations of focus detection points of zones from those shown in FIGS. 15B to 15D, as shown in FIGS. 18B to 18E, are set as a "second focus detection point zone mode". The features of these zones are that each zone is constituted by two adjacent focus detection points, and adjacent focus detection point zones include one common focus detection point. Such zones are suitable for tracing an object which moves in the right-and-left direction.

Figures 19A, 19B, 19C, 19D:
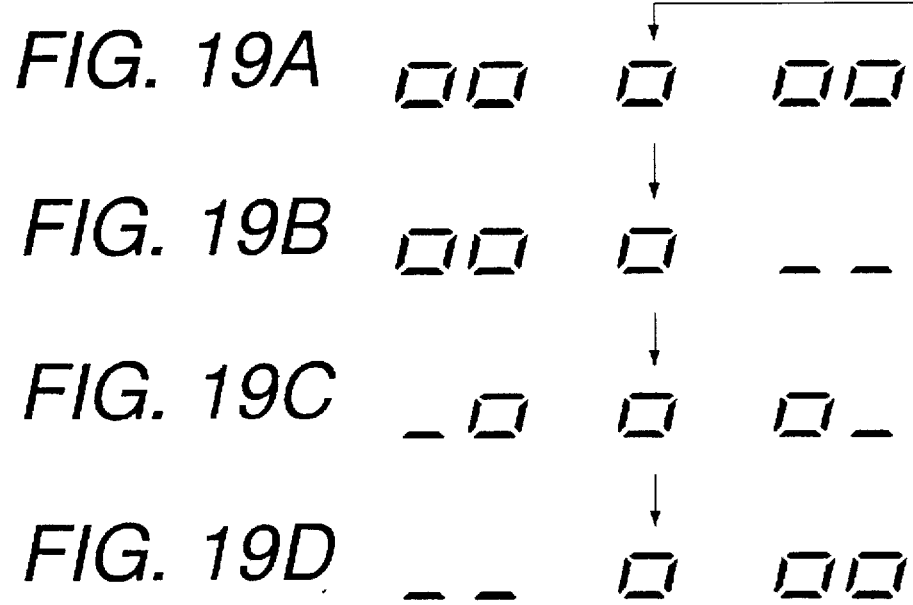
FIGS. 19A to 19D are views showing the states of the focus detection point zones constituted by different numbers of points from those in FIGS. 18A to 18E.

When the AE lock button 43 is further depressed, the display on the 7-segment portion 63 is switched to "3", as shown in FIG. 17D. In this case, the "all focus point detection point zone" and "partial focus detection point zones (C)", which are different from the "second focus detection point zone mode", as shown in FIGS. 19B to 19D, are set as a "third focus detection point zone mode". The feature of these zones is that each zone is constituted by three adjacent focus detection points.

As described above, in the third embodiment, a plurality of focus detection point zone modes in which different numbers of focus detection points are selected from all the focus detection points to constitute zones are available.

When the mode dial 44 is turned from the custom function mode position in one of the display states shown in FIGS. 17A to 17D, the focus detection point selection function is set in the "focus detection point zone mode" shown in a corresponding one of FIGS. 17A to 17D. The selected operation is substantially the same as that described in the first embodiment, except for the numbers or combinations of focus detection points.

In the third embodiment, one of four different focus detection point zone modes can be selected. The characteristic feature of this embodiment is that one of a plurality of focus detection point zone modes can be selected without adding any new external operation switch such as a focus detection point zone selection switch.

For this reason, this embodiment is very advantageous in terms of the shape and cost of the camera. The number of focus detection point zone modes to be selected is not limited to the number of positions of the external operation switch unlike in the second embodiment, and can be increased as long as the CPU capacity allows. However, the operability upon setting of the mode is inferior to that in the second embodiment.

Fourth Embodiment

Many focus detection point zone modes are not always preferable. If many modes are available, many situations can be coped with, but the operability is impaired accordingly.

As the fourth embodiment of the present invention, an "automatic set" operation which does not allow a photographer to arbitrarily set the focus detection point zone mode but allows the camera to automatically set the focus detection point zone mode in correspondence with the photographing mode will be described below.

FIG. 20 shows an example of this operation.

When the program AE photographing mode is selected by the mode dial 44, a focus detection point zone mode consisting of the "all focus detection point zone" and the "partial focus detection point zones (C)" shown in FIGS. 19A to 19D is automatically set.

This mode is suitable for a general photographing operation when the principal object is located at a position slightly deviated from the center of the frame, and the central focus detection point is always enabled.

When the shutter-priority AE mode is selected, a focus detection point zone mode consisting of the "all focus detection point zone" and the "partial focus detection point zones (B)" shown in FIGS. 18A to 18E is automatically set.

This mode is normally suitable for tracing a moving object, and the focus detection points are switched in turn to adjacent ones, as described above.

When the aperture-priority AE mode is selected, a focus detection point zone mode consisting of the "all focus detection point zone" and the "partial focus detection point zones (A)" shown in FIGS. 15A to 15D is automatically set.

This mode is suitable for, e.g., a portrait photographing operation, and when the two upper focus detection points on the frame in a vertical-posture photographing operation are to be enabled, either focus detection point just captures a face portion. In a horizontal-posture photographing operation as well, since a face is normally located at the center or a position slightly offset from the center, three points at the central portion are enabled. In the aperture-priority mode, this focus detection point zone mode is effective.

When the depth of field-priority AE mode is selected, a focus detection point zone mode consisting of the "all focus detection point zone" and the "single focus detection point zones" shown in FIGS. 14A to 14F is automatically set.

Since this mode includes an auto depth mode for setting an aperture value that allows all the focus detection points to fall within the depth of the object field, and a two-point input depth mode for setting an aperture value that allows objects at two arbitrary points to fall within the depth of the object field, this focus detection point zone mode is set.

In the manual exposure mode, only a "single focus detection point zone" is set, and its setting operation is up to a photographer as in an exposure operation.

In the image mode including the full auto mode, portrait mode, and the like, all the functions of the camera are preset, and only the "all focus detection point zone" in which the camera automatically selects one or a plurality of focus detection points from all the focus detection points, as shown in FIG. 19A or the like is also set as the focus detection point zone mode.

In the fourth embodiment, although the photographer cannot select a desired focus detection point zone, no setting operations using switches, input members, and the like are required, and the most effective focus detection point zone is preset, resulting in good operability. Note that selection in a zone selected in each mode is attained by the method described with reference to the corresponding figures.

In this embodiment, the focus detection point zone mode is automatically set in correspondence with the photographing mode, but may be automatically set in correspondence with other photographing function modes of the camera, for example, the photometry (metering) mode (spot metering mode, partial metering mode, average metering mode, evaluation metering mode, split metering mode, and the like), the film feeding mode (continuous photographing mode and single photographing mode), and the AF mode (one-shot mode, servo mode, and the like).

Furthermore, the focus detection point zone mode may be automatically set in correspondence with information input to the camera. For example, FIG. 21 exemplifies a case wherein the focus detection point zone mode is automatically set in correspondence with the focal length of a photographing lens to be mounted. Note that the focal length information is transmitted from the focus adjustment circuit 110 which detects the information of the focus length information code plate 38 of the photographing lens 1 to the camera CPU 100 via the mount contact 39.

The kinds of zones are basically the same as those in the above-mentioned third embodiment (FIG. 20), and a detailed description thereof will be omitted. When a wide-angle lens of "less than 35 mm" is mounted, only the all focus detection point zone for performing focus detection over a broad field of view is set. A lens "more than or equal to 35 mm to less than 70 mm" is ordinarily used in the range of a standard zoom lens, and has two different zones, i.e., the "all focus detection point zone" for performing focus detection over a broad field of view and the "single focus detection point zones" for performing distance measurements in a narrow field of view. Since a lens "more than or equal to 70 mm to less than 135 mm" is suitable for a portrait photographing operation, the same mode as the aperture-priority AE mode shown in FIG. 20 above is set. The focus detection point zones of telephoto lenses "more than or equal to 135 mm" are classified into the "focus detection point zones (B)" constituted by two points and the "focus detection point zones (C)" constituted by three points to have 300 mm as a boundary since the moving speed of an object in the frame becomes high and the object may easily deviate from the focus detection point in an ultra-telephoto region of "more than or equal to 300 mm". Since the dimensions of the lens are large, and camera shake easily occurs, the object may also easily deviate from the focus detection point. For this reason, a focus detection point zone having a larger number of focus detection points than that for a lens "less than 300 mm" is set.

Fifth Embodiment

Figure 22:
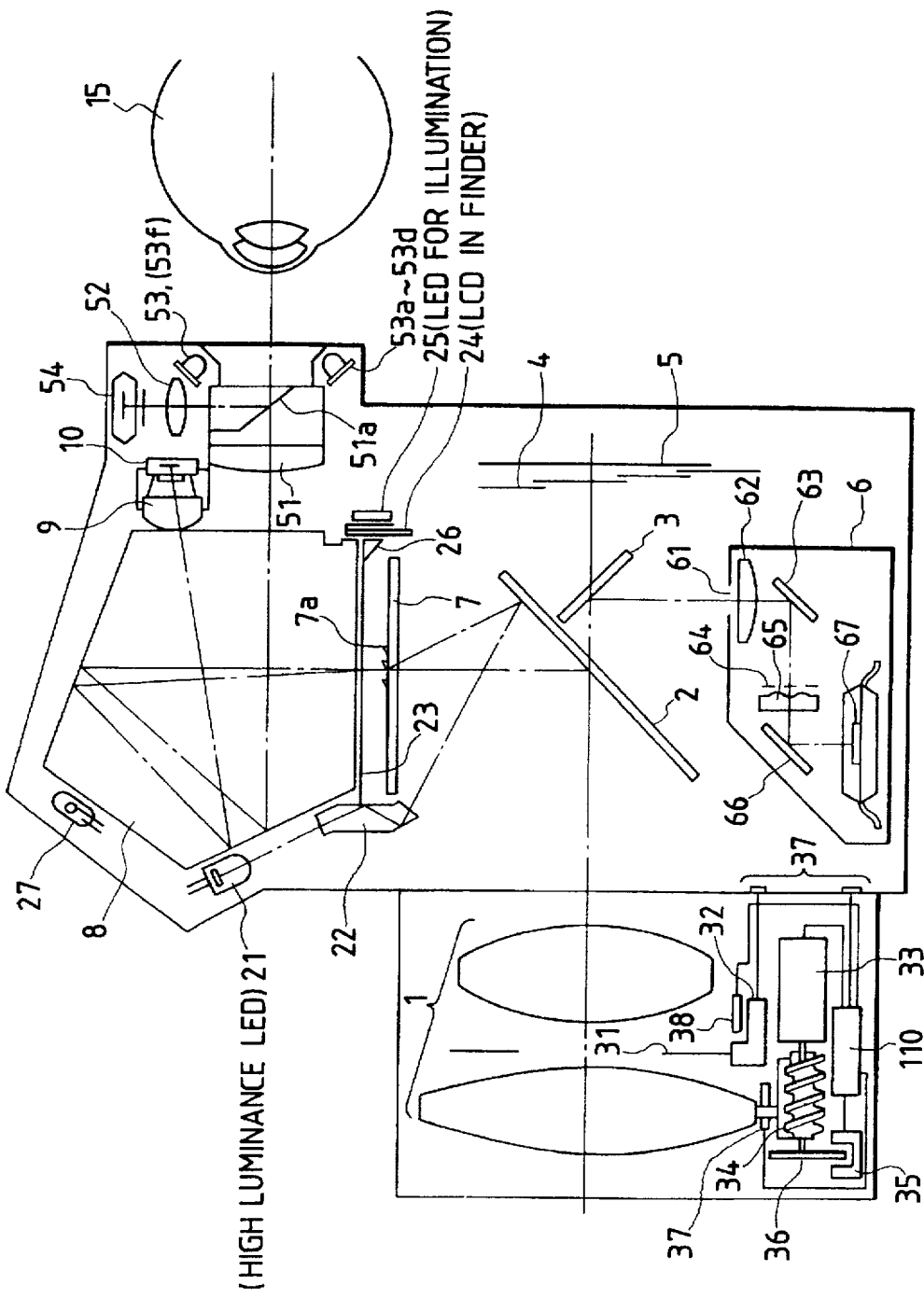
FIG. 22 is a view showing a principal part of the optical arrangement of an automatic focusing camera according to the fifth embodiment of the present invention.
Figure 23:
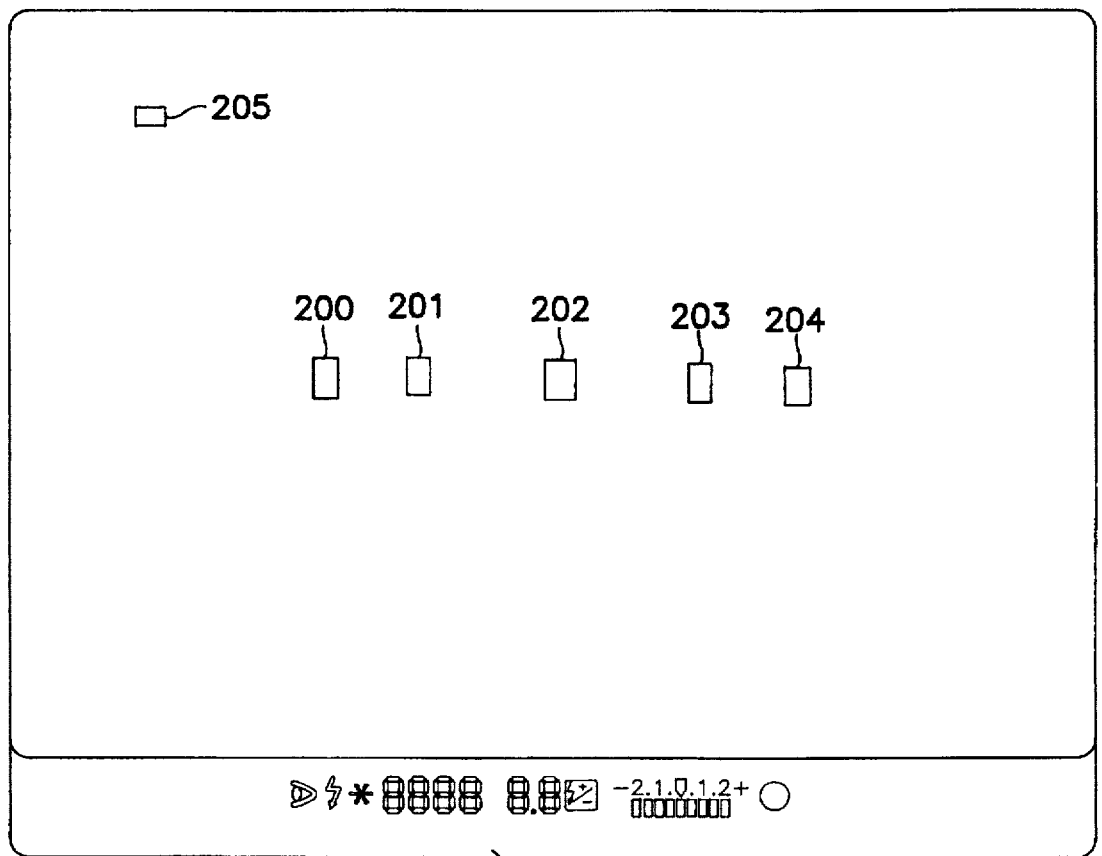
FIG. 23 is a view showing the display state in the finder of the camera shown in FIG. 22.

FIG. 22 is a view showing the arrangement of a principal part of the fifth embodiment in which the present invention is applied to a single-lens reflex camera. The fifth embodiment is characterized by comprising a line-of-sight detection device. Note that the same reference numerals in FIG. 22 denote the same parts as in FIG. 1, and a detailed description thereof will be omitted. FIG. 23 is a view showing the field of view in the finder of the single-lens reflex camera shown in FIG. 22.

Referring to FIG. 22, an eyepiece lens 51 is disposed behind the exit surface of the pentagonal prism 8, and has a beam splitter 51a. The eyepiece lens 51 is used for observing the focusing plate 7 by an eye 15 of a photographer. The beam splitter 51a comprises, e.g., a dichroic mirror which transmits visible light and reflects infrared light.

An imaging lens 52 is arranged below an image sensor 54 on which photoelectric conversion element arrays such as CCDs are two-dimensionally arranged. The image sensor 54 is disposed to be conjugate with a position near the pupil of the eye 15 of the photographer, which is located at a predetermined position with respect to the imaging lens 52. Infrared light-emitting diodes (to be abbreviated as IREDs hereinafter) 53a to 53f serve as illumination light sources, and are disposed around the eyepiece lens 51, as shown in FIG. 24B (to be explained later).

These components and the above-mentioned dichroic mirror 51a constitute the line-of-sight detection device.

In the line-of-sight detection method, the eyeball of the photographer is illuminated with light emitted by each IRED (53a to 53f). The light beam reflected by the eyeball is reflected by the dichroic mirror 51a via the eyepiece lens 51, and forms an eyeball image on the image sensor 54 by the imaging lens 52.

Subsequently, the rotation angle of the eyeball is calculated by detecting the relative displacement amount between the center of the pupil of the eyeball image and the reflected images of the IREDs reflected by the surface of the cornea, and the position where the photographer observes, i.e., the line-of-sight position, is detected.

Detailed processing for detecting the line-of-sight position on the basis of the output from the image sensor 54 can use the technique already disclosed in Japanese Laid-Open Patent Application No. 3-109029 by the present applicant, and a detailed description thereof will be omitted.

The parallelogramic frame on the upper left portion in the finder field in FIG. 23 is a line-of-sight input index 205. When the above-mentioned line-of-sight detection device detects that the line of sight of the photographer is present on or near the line-of-sight input index 205, a stop-down function for stopping down the aperture of the photographing lens 1 to the aperture size to be actually set is started to confirm a predetermined function of the camera, e.g., the depth of field.

The fifth embodiment of the present invention uses this line-of-sight input function in place of the focus detection point zone selection switch 47 in the above-mentioned second embodiment (FIG. 12B).

FIGS. 24A and 24B and FIGS. 25A and 25B are respectively a top view, a rear view, and a block diagram of the single-lens reflex camera of the fifth embodiment, and correspond to FIGS. 4A, 4B, 6A and 6B in the first embodiment.

Differences from FIGS. 4A and 4B and FIG. 6 will be mainly described below.

Figure 24A:
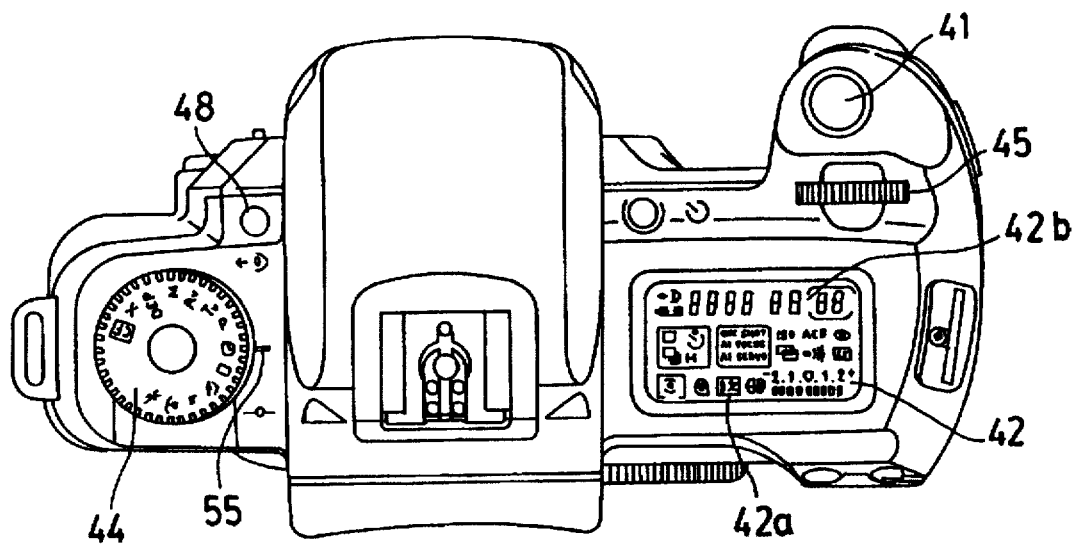
FIGS. 24A and 24B are respectively a top view and a rear view of the camera shown in FIG. 22.
Figure 24B:
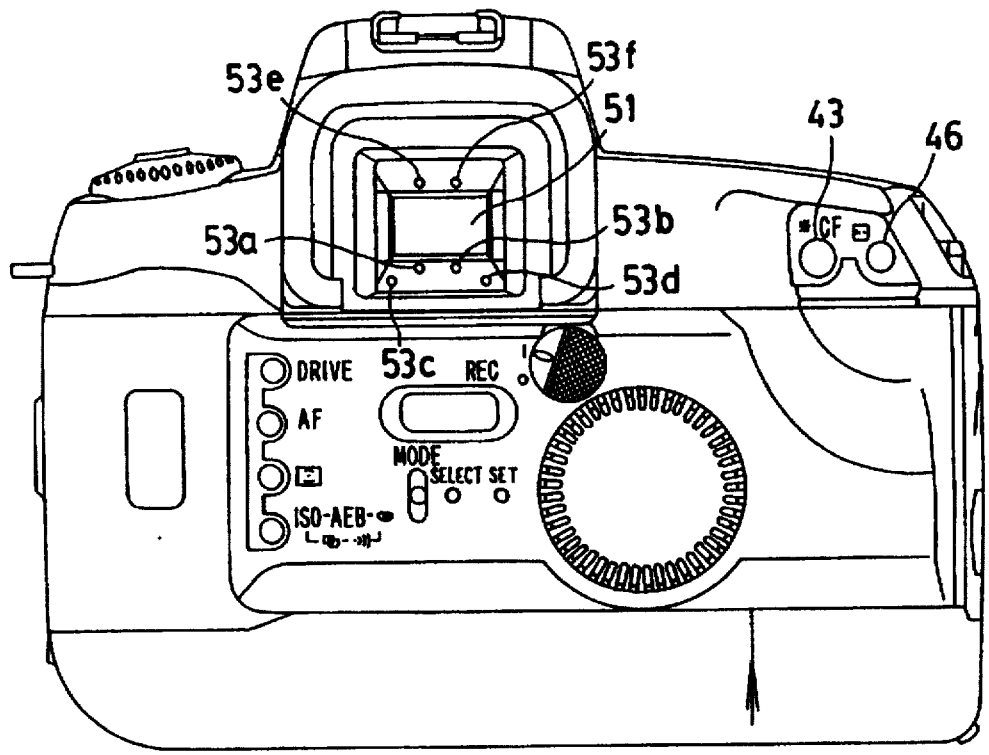

Referring to FIG. 24A, a line-of-sight input button 48 is used for turning on/off the function of the above-mentioned line-of-sight input device. Upon depression of the line-of-sight input button, the line-of-sight input function is turned on/off to switch the focus detection point selection mode between a "line-of-sight input focus detection point selection" mode for detecting the line-of-sight position of the photographer by a known technique, and determining one of a plurality of focus detection points, and the above-mentioned "automatic focus detection point selection" mode based on the automatic selection algorithm.

Figure 25B:
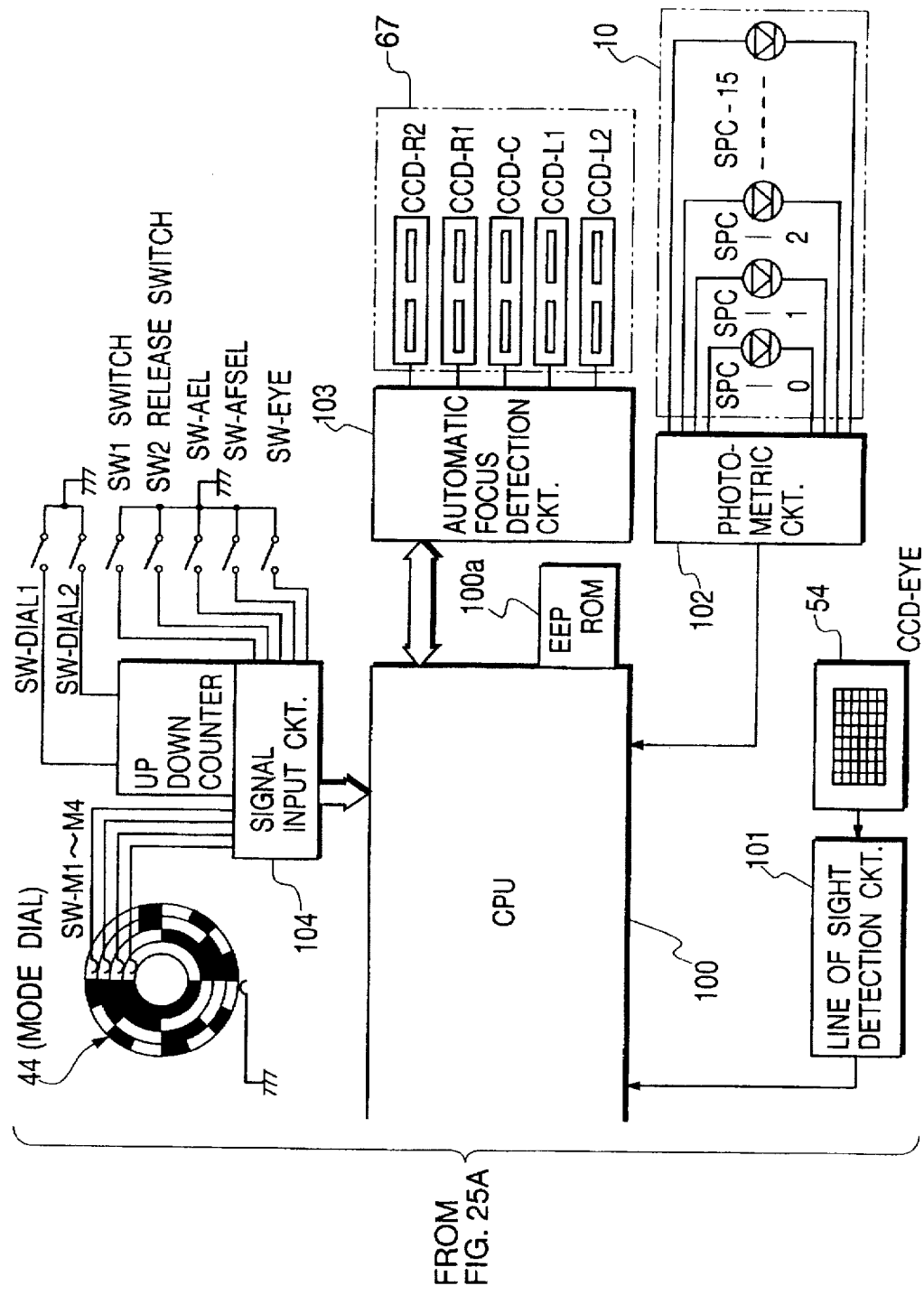
FIG. 25, comprised of FIGS. 25A and 25B, is a block diagram showing the electrical arrangement of the camera shown in FIG. 22.

Referring to FIGS. 25A and 25B, a switch SW-EYE corresponds to the line-of-sight input button 48, and its state signal is input to the signal input circuit 104 as in other operation switches.

The circuit arrangement of the line-of-sight input device will be explained below.

The CPU 100 is further connected to a line-of-sight detection circuit 101 and an IRED driving circuit 107. The EEPROM 100a further has a storage function of line-of-sight correction data for correcting the individual difference of the line of sight.

The line-of-sight detection circuit 101 A/D-converts an eyeball image signal from the image sensor 54 (CCD-EYE), and transmits the image information to the CPU 100. The CPU 100 extracts the feature points of the eyeball image required for line-of-sight detection in accordance with a predetermined algorithm, as will be described later, and calculates the line of sight of the photographer on the basis of the positions of the feature points.

The IRED driving circuit 107 selectively turns on the infrared light-emitting diodes (IRED1 to IRED6) 53a to 53f in correspondence with each situation.

Figure 26:
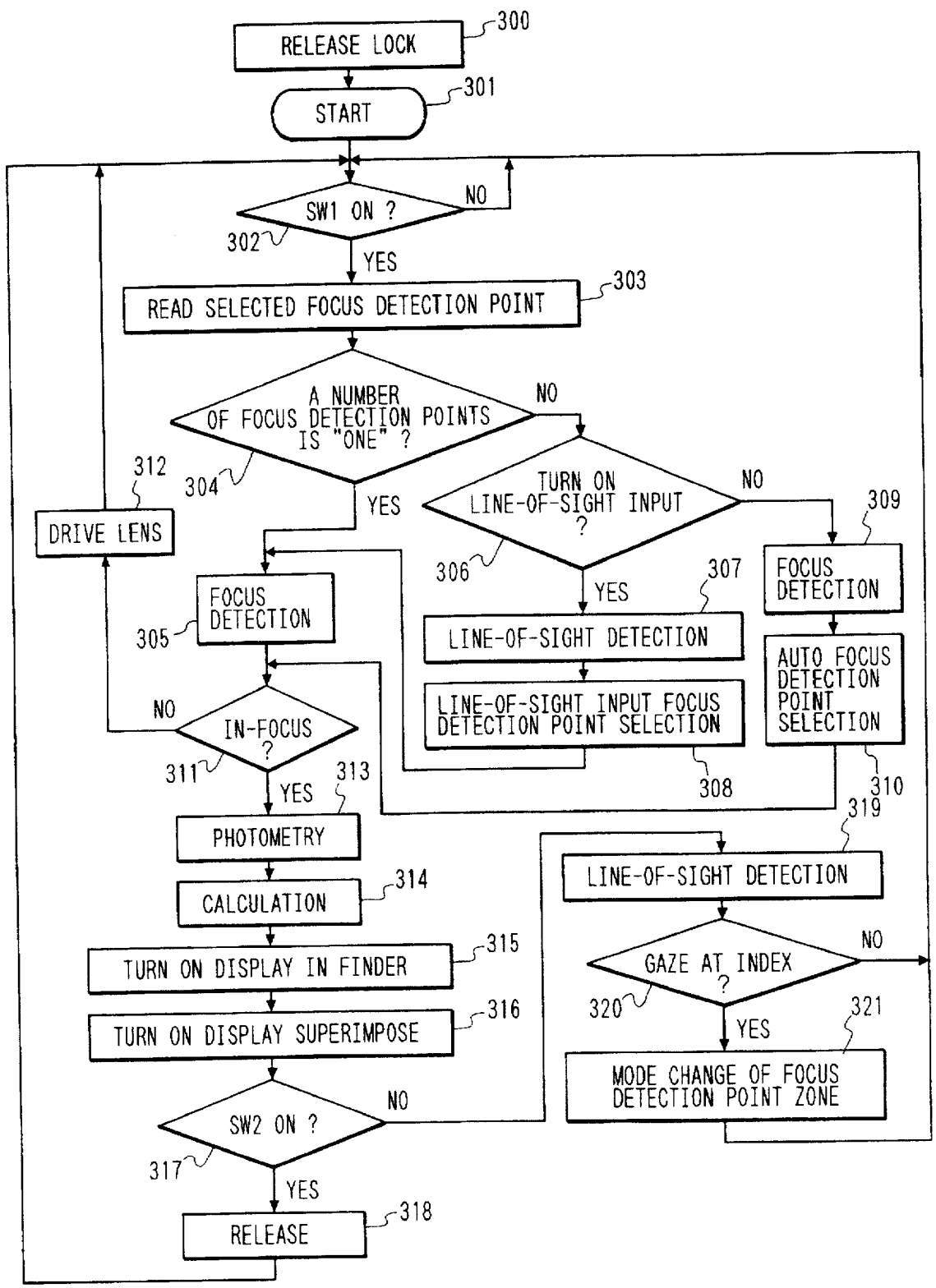
FIG. 26 is a flow chart showing the operation upon releasing of a lock in the fifth embodiment of the present invention.

The operation of the camera for switching the focus detection point zone mode using the line-of-sight input function as the characteristic feature of the fifth embodiment will be described below with reference to the flow chart in FIG. 26.

When the mode dial 44 of the camera is unlocked in step 300, the camera is set in an operation standby state (the operation switches can be accepted), and the sequence starts from step 302 via step 301.

In step 302, it is checked if the switch SW-1 is ON upon depression of the release button 41. If NO in step 302, the flow stays in this step until the switch SW-1 is turned on. Thereafter, when the switch SW-1 is turned on, the flow advances to step 303, and the CPU 100 reads the selected focus detection point from the EEPROM 100a. In the following description, assume that the focus detection point zone mode consisting of the "all focus detection point zone" and the "single focus detection point zones" shown in FIGS. 14A to 14F is set.

It is then checked in step 304 if the number of read focus detection points is one. If a "single focus detection point zone" is selected, the flow advances to step 305 to perform focus detection using one selected focus detection point, and the defocus amount is calculated on the basis of the output from the corresponding CCD. On the other hand, if the "all focus detection point zone" is selected, since all the focus detection points are read, a plurality of focus detection points are selected, and the flow advances to step 306. In step 306, it is checked based on the switch SW-EYE if the line-of-sight input function is ON. If YES in step 306, the flow advances to step 307.

In step 307, the line-of-sight position of the photographer is detected using the line-of-sight detection circuit 101 on the basis of a known line-of-sight detection method. In step 308, the above-mentioned "line-of-sight input focus detection point selection" function for selecting a focus detection point closest to the detected line-of-sight position from all the focus detection points is executed. The flow then advances to step 305 to perform focus detection using the selected focus detection point.

If it is determined in step 306 that the line-of-sight input function is OFF, the flow advances to step 309 to perform focus detection using all the focus detection points, and the defocus amounts of the respective focus detection points are calculated on the basis of the outputs from the corresponding CCDs. In step 310, the "automatic focus detection point selection" function for selecting a focus detection point which is assumed to correspond to a principal object is executed on the basis of the defocus amounts and absolute distance information.

In steps 309 and 310, the same operations as in steps 206 and 207 in the first embodiment are performed. Upon selection of a focus detection point, the above-mentioned automatic selection algorithm is used.

Upon completion of step 305 or 310, the flow advances to step 311 to detect if the selected focus detection point has reached an in-focus state.

Since steps 311 to 316 are the same as steps 208 to 213 in the first embodiment, a description thereof will be omitted.

The flow then advances to step 317 to check the state of the release switch SW-2. If the release switch SW-2 is ON, the flow advances to step 318 to execute the above-mentioned release sequence. Upon completion of the release sequence, the flow returns to step 302 to repeat a series of sequence operations.

On the other hand, if the release switch SW-2 is OFF, the flow advances to step 319, and the line-of-sight detection circuit 101 detects the line-of-sight position of the photographer again. In step 320, it is checked if the detected line-of-sight position hits a position on or near the line-of-sight input index 205 a predetermined number of times or for a predetermined period of time, i.e., if the photographer gazes the line-of-sight input index 205. If NO in step 320, the flow returns to step 302.

On the other hand, if YES in step 320, the flow advances to step 321. In step 321, the currently selected focus detection point mode consisting of the "all focus detection point zone" and the "single focus detection point zones" is switched to another focus detection point zone mode consisting of the "all focus detection point zone" and the "partial focus detection point zones (A)" shown in FIGS. 15A to 15D, and the flow returns to step 302. Of course, the type of the focus detection point zone mode to be selected is not limited to that in this embodiment, but the focus detection point zone mode may be switched to any one of the partial focus detection point zones described so far.

As described above, in this embodiment, the focus detection point zone mode can be easily switched between, e.g., the "partial focus detection point zones" and the "single focus detection point zones" without adding any focus detection point zone selection switch 47 on the outer surface of the camera main body. This embodiment is particularly effective when the mode is to be switched during the photographing operation when the photographer does not want to leave his or her eyes from the finder.

Sixth Embodiment

In the fifth embodiment described above, a plurality of focus detection point zone modes which have already been preset in the camera are selected. However, in the sixth embodiment, a photographer can set a desired combination of focus detection points as a focus detection point zone, and the degree of freedom of the photographer is remarkably increased. In addition, since the sixth embodiment comprises the line-of-sight detection device like in the fifth embodiment, the focus detection point zone is set based on the line-of-sight input.

FIGS. 27A to 27D are views showing the superimpose-display states of the focus detection points in the finder field upon setting of the focus detection point zone mode in the sixth embodiment of the present invention.

The operation upon setting of the focus detection point zone mode of this embodiment will be described below with reference to the flow chart in FIG. 28 and FIGS. 27A to 27D.

First, the camera detects the states of various operation switches in a standby state, and it is checked in step 401 if a focus detection point zone setting button is turned on. Although not shown, the focus detection point zone setting button may be arranged in place of the line-of-sight input button 48 in FIG. 24A in the fifth embodiment, or may be independently arranged as a push-button switch on the camera main body. A description and illustration associated with the form of this button will be omitted here.

If the focus detection point zone setting button is ON, the flow advances to step 402, and the mode timer is started. If the button is not ON, the control returns to the standby state to continue the state detection of various operation switches.

In step 403, the currently selected focus detection point zone is displayed on the LCD 42 for the monitor using the 7-segment portion 42b as in the first embodiment. In this case, for the sake of easy description, a blank display (nothing is displayed) as a non-selected state is assumed to be an initially selected state.

Figure 27A:
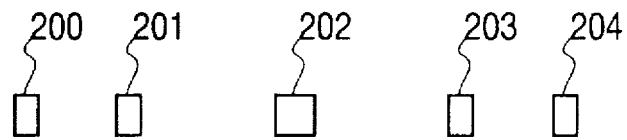
FIGS. 27A to 27D are views for explaining the selection of focus detection points in the sixth embodiment of the present invention.

In step 404, the photometry operation of photometry regions corresponding to all the focus detection points is performed to perform a superimposed display in step 405. In step 405, the superimposed LEDs 21 are turned on at duty ratios (so-called luminance modulation) based on the photometric values obtained in step 404, thus superimpose-displaying all the focus detection points. FIG. 27A shows the state at that time, and indicates a non-selected state.

It is then checked in step 406 if the release button 41 serving as a line-of-sight input trigger switch is depressed, and the switch SW-1 is ON. If the switch SW-1 is ON, the flow advances to step 407; otherwise, the flow advances to step 413.

Figure 27B:
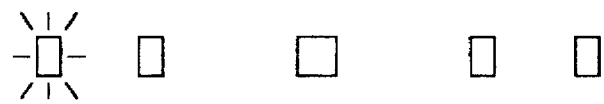

In step 407, the line-of-sight detection circuit 101 detects the line-of-sight position of the photographer. In step 408, it is checked if the detected line-of-sight position is located on or near one of all the focus detection points 200 to 204 or on a position other than the position near the focus detection point. If it is determined that the line-of-sight position is located on or near the focus detection point, the display state of the focus detection point corresponding to the line-of-sight position (i.e., the focus detection point selected by the line of sight) is changed from the ON state (indicating a non-selected state) to the ON/OFF flashing state (indicating a selected state), or vice versa in step 409. FIG. 27B shows the state at that time, and indicates that the focus detection point 200 at the left end is set.

In step 410, one of the focus detection points constituting the focus detection point zone is set, and is stored in the EEPROM 100a.

As described above, the focus detection point to be set as the focus detection point zone can be input on the basis of the line-of-sight position of the photographer at the depression timing of the release button in the focus detection point zone setting state.

In step 411, the line-of-sight detection circuit 101 detects the line-of-sight position of the photographer again, and the flow advances to step 412. On the other hand, if it is determined in step 408 that the line-of-sight position is located at a position other than the position near the focus detection point, the flow also advances to step 412.

In step 412, it is checked if the detected line-of-sight position hits a position on or near the line-of-sight input index 205 a predetermined number of times or for a predetermined period of time, i.e., if the photographer gazes the line-of-sight input index 205. If YES in step 412, the flow escapes from the focus detection point zone setting mode, and the camera is set in the standby state.

On the other hand, if NO in step 412, the flow advances to step 413. If it is determined in step 406 that the switch SW-1 is OFF, the flow also advances to step 413. It is checked in step 413 if the mode timer is operating. As a result, if the mode timer has measured a predetermined period of time, the flow escapes from the focus detection point zone setting mode, and the camera is set in the standby state. On the other hand, if the mode timer is operating, the flow advances to step 414 to check if another button is operated. If YES in step 414, the corresponding operation mode is started. If NO in step 414, the flow returns to step 403 to repeat a series of sequence operations.

Figure 27C:
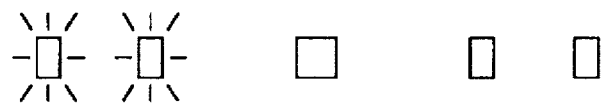
Figure 27D:
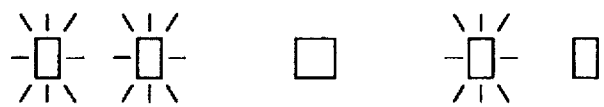
Figure 28:
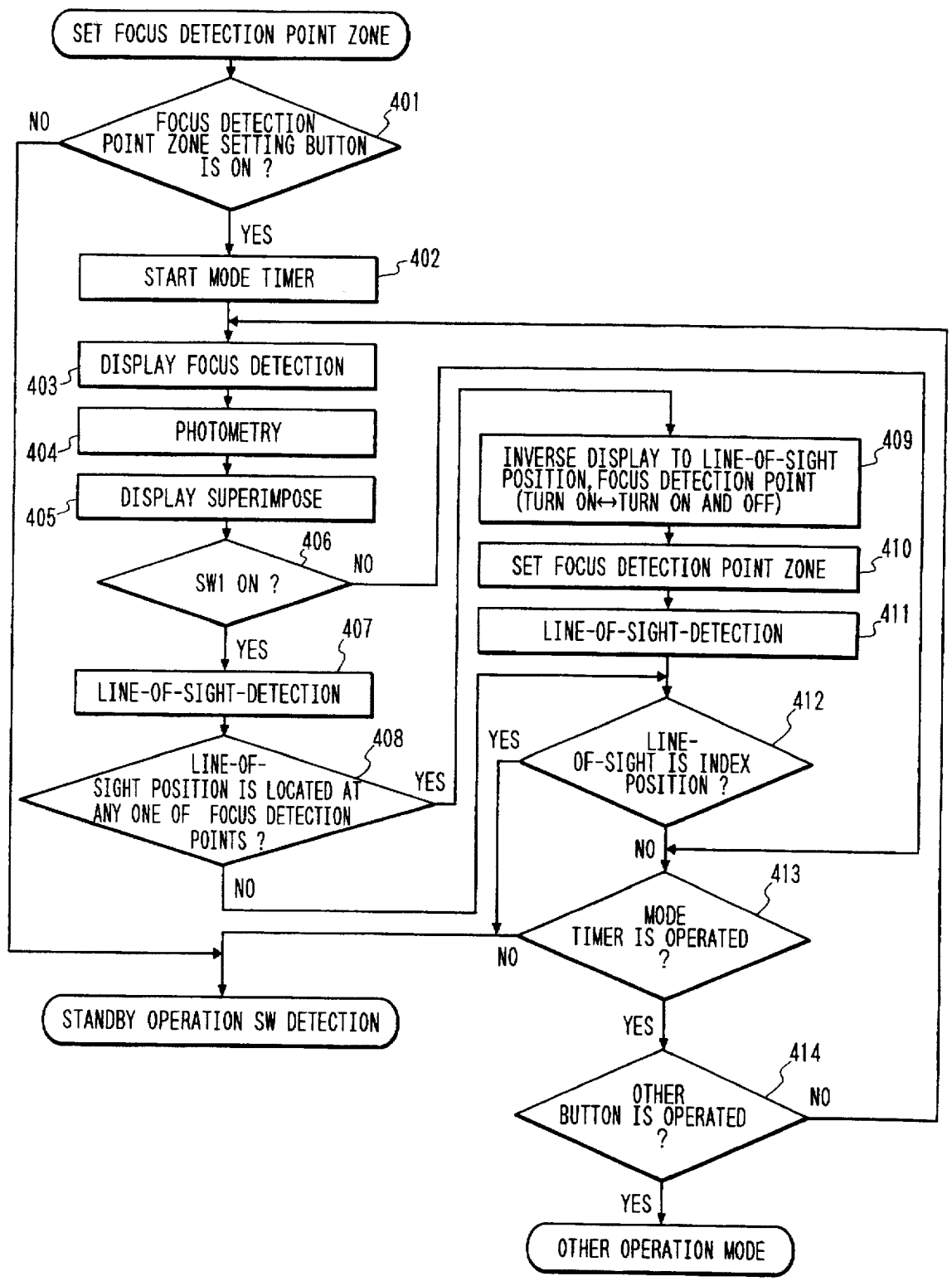
FIG. 28 is a flow chart showing the operation upon setting of a focus detection point zone in the sixth embodiment of the present invention.

FIG. 27C shows a state wherein the focus detection zone setting operation is repeated and the second focus detection point 201 from the left end is added to the focus detection point zone by the line-of-sight input in the above-mentioned sequence. As a result, the focus detection point zone is constituted by the focus detection points 200 and 201, and the photographer sets the focus detection point zone shown in FIG. 9G. FIG. 27D shows a state wherein the second focus detection point 203 from the right end is further added to the focus detection point zone by the line-of-sight input. Such a focus detection point zone constituted by the focus detection points 200, 201, and 203 cannot be set in the above-mentioned embodiments, and is a feature of this embodiment.

As is apparent from the above description of the focus detection point zone setting sequence, when the focus detection point set in the focus detection point zone (the focus detection point which is turned on/off) is designated by the line-of-sight input by the same method as that upon setting, the ON/OFF display is switched to the ON display in step 409, and the focus detection point is canceled from the focus detection point zone in step 410. As a result, a new focus detection point zone is stored in the EEPROM 100a.

As described above, according to this embodiment, the photographer can arbitrarily set or cancel focus detection points constituting a focus detection point zone by his or her line of sight.

In this embodiment, focus detection points constituting a given focus detection point zone are set or canceled using the line-of-sight detection device. Alternatively, a special-purpose input button (switch) for setting a focus detection point zone may be added, and when one focus detection point is called using the electronic dial 45 upon depression of the focus detection point selection button 46, and the above-mentioned input button is depressed at that time, the corresponding focus detection point may be set or canceled.

According to each of the above embodiments, since the photographer can change the size (the number of focus detection points) of an arbitrary focus detection point zone depending on the object, a focusing error with respect to an object other than a principal object due to too broad a focus detection point zone can be prevented, and an accurate focusing operation on a principal object that the photographer intended can be attained. Such control is particularly effective for a portrait photographing operation and a close-up photographing operation.

On the contrary, the principal object can be prevented from deviating from the intended focus detection point upon movement of an object or by slightly changing the photographing field even if the focus detection point zone includes only one point. Since one of a plurality of focus detection points always captures the principal object, an accurate focusing operation on the principal object can be realized.

Since focus detection is performed using limited ones of all the focus detection points, the focus detection time is shortened, and an in-focus state can be attained quickly. In the servo AF mode in which a moving object is traced, the object is always traced using a plurality of ones of all the focus detection points so that the focus detection points change in units of focus detection point zones in place of being changed one by one in correspondence with the movement of the object. For this reason, automatic focus detection means which can trace an object well and can quickly attain an in-focus state can be realized.

Since a plurality of focus detection point zone modes each consisting of a plurality of focus detection points are set in the custom function mode, the number of modes can be easily increased without increasing the cost of, e.g., an operation member.

Furthermore, when the focus detection point zone mode is automatically set in correspondence with the photographing mode or information such as focal length information input to the camera, a setting operation can be omitted, thus improving operability.

Furthermore, in a camera comprising a line-of-sight detection device, the focus detection point zone mode can be easily switched by utilizing the line-of-sight input function. Furthermore, since the photographer can arbitrarily set a desired combination of focus detection points as a focus detection point zone, the will of every photographer can be reflected in the photographing operation, and the degree of freedom of the photographer is greatly increased, thus providing an AF camera which operates according to the photographer's will and has good operability.

In the above description, the present invention is applied to a camera such as a single-lens reflex camera, a lens-shutter camera, a video camera, or the like, but may be applied to other optical equipment or other apparatuses, or a unit constituting another apparatus.

Furthermore, the present invention may appropriately combine the above-mentioned embodiments or their techniques.

What is claimed is:

1. A focus adjusting apparatus which comprises a focus detection device for independently detecting focus states of N different regions in a scene, said apparatus comprising:

(a) a selection circuit for simultaneously selecting, among the N regions, an arbitrary number of regions, the arbitrary number being less than N, and said selection circuit setting, among the N regions which are all selectable, a first number and a second number, different from the first number, of regions as regions simultaneously selected; and (b) a focus adjustment circuit for performing focus adjustment on the basis of the focus states independently detected in the regions set by said selection circuit.

2. A focus adjusting apparatus which comprises a focus detection device for independently detecting focus states of N different regions in a scene, said apparatus comprising:

(a) a selection circuit for simultaneously selecting, among the N regions, a number, which is less than N, of arbitrary regions, said selection circuit setting, among the N regions which are all selectable, a first number and a second number, different from the first number, of regions as regions simultaneously selected;

(b) a focus adjustment circuit for performing focus adjustment on the basis of the focus states independently detected in the regions set by said selection circuit.

3. A camera having a focus adjusting apparatus which comprises a focus detection device for independently detecting focus states of N different regions in a scene, and having a photographing processing apparatus for performing a photographing operation in a plurality of photographing modes, said camera comprising:

(a) a region designating circuit having a plurality of selection modes including at least a first mode for selecting, among the N regions which are all selectable, a first plurality of regions and a second mode for selecting, among the N regions which are all selectable, a second plurality of regions, larger in number than the first plurality of regions, said region designating circuit designating a predetermined selection mode in correspondence with the photographing mode; and (b) a focus adjustment circuit for performing focus adjustment on the basis of focus states independently detected in the plurality of regions in the mode designated by said region designating circuit.

4. A camera having a focus adjusting apparatus which comprises a focus detection device for independently detecting focus states of N different regions in a scene, and having a photographing processing apparatus for performing a photographing operation in a plurality of photographing modes, said camera comprising:

(a) a region selection circuit having a plurality of modes including at least a first mode for selecting one or a plurality of arbitrary regions from the N regions and a second mode for at least selecting a region in a selection pattern different from the first mode, said region selection circuit selecting a predetermined mode in correspondence with the photographing mode; and (b) a focus adjustment circuit for performing focus adjustment on the basis of a focus state detected in the mode selected by said region selection circuit.

5. A camera according to claim 4, wherein the second mode selects a larger number of regions than the regions selected in the first mode.

6. A camera according to claim 5, wherein the second mode selects a larger number of arbitrary regions than the regions selected in the first mode.

7. A camera according to claim 4, wherein the first mode selects the one or a plurality of arbitrary regions or a predetermined number of regions.

8. A camera according to claim 3, wherein the photographing mode is an exposure mode.

9. A camera according to claim 4, wherein the photographing mode is an exposure mode.

10. A camera having a focus adjusting apparatus which comprises a focus detecting device for independently detecting focus states of N different regions in a scene, said camera comprising:

(a) a region selection circuit having a first mode for selecting one of an arbitrary region among the N regions, which are all selectable, and a second mode for selecting a pattern of a region, which is different at least from the pattern in the first mode, from among the N regions, which are all selectable, said region selection circuit selecting a predetermined mode in accordance with a focal length of a photographing lens; and (b) a focus adjustment circuit for performing focus adjustment on the basis of a focus state detected in the region in the mode selected by said region selection circuit.

11. A camera having a focus adjusting apparatus which comprises a focus detection device for independently detecting focus states of N different regions in a scene, and a photographing processing apparatus for performing a photographing operation in a plurality of photographing modes, said camera comprising:

(a) a region designating circuit having a first mode for selecting first plural regions among the N regions, which are all selectable, and a second mode for selecting second plural regions, larger in number than the first plural regions, among the N regions, which are all selectable, said region designating circuit designating a predetermined selection mode in accordance with a lens characteristic of a photographing lens; and (b) a focus adjustment circuit for performing focus adjustment on the basis of a focus state independently detected in the plurality of regions in the mode designated by said region designating circuit.

12. A camera according to claim 10, wherein the second mode selects a larger number of regions than the regions selected in the first mode.

13. A camera according to claim 12, wherein the second mode selects a larger number of arbitrary regions than the regions selected in the first mode.

14. A camera according to claim 10, wherein the first mode selects the one or a plurality of arbitrary regions or a predetermined number of regions.

15. An automatic focusing camera which comprises focus detection means having at least three focus detection points in a finder field, said camera comprising:

(a) focus detection point zone selection means for selecting one of a first focus detection point zone consisting of all the focus detection points, a second focus detection point zone consisting of at least two focus detection points selected from all the focus detection points, and a third focus detection point zone consisting of one of all the focus detection points; and (b) focus adjustment means for performing focus adjustment on the basis of one or a plurality of focus states detected at one or a plurality of focus detection points in the focus detection point zone selected by said focus detection point zone selection means.

16. An automatic focusing camera which comprises focus detection means having at least four focus detection points in a finder field, said camera comprising:

(a) focus detection point zone selection means for selecting one of a first focus detection point zone consisting of all the focus detection points, a second focus detection point zone consisting of at least two focus detection points selected from all the focus detection points, and a third focus detection point zone having a different number of focus detection points from the number of focus detection points of the second focus detection point zone; and (b) focus adjustment means for performing focus adjustment on the basis of one or a plurality of focus states detected at one or a plurality of focus detection points in the focus detection point zone selected by said focus detection point zone selection means.

17. A camera according to claim 15, further comprising setting means for, when said focus detection point zone selection means selects a focus detection point zone consisting of a plurality of focus detection points selected from all the focus detection points, setting at least two arbitrary focus detection points from all the focus detection points to constitute the focus detection point zone.

18. A camera according to claim 16, further comprising setting means for, when said focus detection point zone selection means selects a focus detection point zone consisting of a plurality of focus detection points selected from all the focus detection points, setting at least two arbitrary focus detection points from all the focus detection points to constitute the focus detection point zone.

19. A camera according to claim 17, wherein adjacent ones of a plurality of focus detection point zones which can be set by said setting means include at least one common focus detection point constituting the zones.

20. An automatic focusing camera which comprises focus detection means having at least three focus detection points in a finder field, said camera comprising:

(a) zone mode setting means for setting one of a first focus detection point zone mode having a plurality of focus detection point zones each consisting of at least two focus detection points selected from all the focus detection points, and a second focus detection point zone mode having focus detection point zones each consisting of a different number of focus detection points from the number of focus detection points of the focus detection point zone of the first focus detection point zone mode; and (b) focus adjustment means for performing focus adjustment on the basis of focus detection information obtained at each of the focus detection points of the set focus detection point zone.

21. A camera according to claim 20, wherein said zone mode setting means automatically sets one of the first and second focus detection point zone modes in correspondence with a photographing mode of said camera.

22. A camera according to claim 20, wherein said zone mode setting means automatically sets one of the first and second focus detection point zone modes in correspondence with lens information of a photographing lens to be used.

23. A camera according to claim 20, further comprising a line-of-sight input index arranged in a finder, and line-of-sight detection means for detecting a line-of-sight position of a photographer, and wherein said zone mode setting means is enabled when said line-of-sight detection means detects that the line-of-sight position of the photographer is located on or near the line-of-sight input index.

24. A camera according to claim 21, further comprising a line-of-sight input target arranged in a finder, and line-of-sight detection means for detecting a line-of-sight position of a photographer, and wherein said zone mode setting means is enabled when said line-of-sight detection means detects that the line-of-sight position of the photographer is located on or near the line-of-sight input index.

25. A camera having a focus adjusting apparatus which comprises a focus detection device for independently detecting focus states of N different regions in a scene, and having a photographing processing apparatus for performing a photographing operation in a plurality of photographing modes, said camera comprising:

(a) a region selection circuit having a first mode for selecting at least one of an arbitrary region among the N regions, which are all selectable, and a second mode for selecting a pattern of a region, which is different at least from a pattern under the first mode among the N regions, which are all selectable, said region selection circuit selecting a predetermined mode in accordance with a photographing mode; and (b) a focus adjustment circuit for performing focus adjustment on the basis of a focus state detected in the region in the mode selected by said region selection circuit.

26. A camera adding to claim 25, wherein the second mode selects a larger number of arbitrary regions than the regions selected in the first mode.

27. A camera having a focus adjusting apparatus which comprises a focus detection device for independently detecting focus states of N different regions in a scene, said camera comprising:

(a) a region selection circuit having a first mode for selecting at least one of an arbitrary region among the N regions, which are all selectable, and a second mode for selecting a pattern of a region which is different from a selection pattern under the first mode among the N regions, which are all selectable; and (b) a focus adjustment circuit for performing focus adjustment on the basis of a focus state detected in the region in the mode selected by said region selection circuit.

28. A camera according to claim 27, wherein the second mode selects a larger number of arbitrary regions than the regions selected in the first mode.

29. A camera having a focus adjusting apparatus which comprises a focus detection device for independently detecting focus states of N different regions in a scene, said camera comprising:

(a) a selection circuit for simultaneously selecting, among the N regions, an arbitrary number of arbitrary regions; and (b) a focus adjustment circuit for performing focus adjustment on the basis of a focus state detected in the region selected by said selecting circuit.

30. A camera according to claim 29, wherein said camera includes a line of sight detection circuit, said selection circuit selecting a region to which said line of sight detection circuit detects that the line of sight is directed.

* * * * *

UNITED STATES PATENT AND TRADEMARK OFFICE
CERTIFICATE OF CORRECTION

PATENT NO.    : 5,692,222
DATED         : November 25, 1997
INVENTOR(S)   : Akira Yamada et al.

It is certified that error appears in the above-identified patent and that said Letters Patent is hereby corrected as shown below:

Title page,
Item [56], Reference Cited, FOREIGN PATENT DOUCMENTS,
1288813     11/1989     Japan
3109029     5/1991      Japan" should read
-- 1-288813 11/1989     Japan
3-109029    5/1991      Japan --.

Column 12,
Line 34, "showing" should read -- showing the --.

Column 22,
Line 48, "selected;" should read -- selected; and --.

Signed and Sealed this

Sixth Day of January, 2004

JAMES E. ROGAN
*Director of the United States Patent and Trademark Office*